United States Patent
Li et al.

(10) Patent No.: US 10,944,462 B2
(45) Date of Patent: Mar. 9, 2021

(54) DATA TRANSMISSION METHOD AND APPARATUS

(71) Applicant: Huawei Technologies Co., Ltd., Shenzhen (CN)

(72) Inventors: Xueru Li, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/671,722

(22) Filed: Nov. 1, 2019

(65) Prior Publication Data

US 2020/0067586 A1    Feb. 27, 2020

Related U.S. Application Data

(63) Continuation of application No. PCT/CN2018/085427, filed on May 3, 2018.

(30) Foreign Application Priority Data

May 4, 2017    (CN) .......................... 201710309801.X

(51) Int. Cl.
*H04B 7/06*      (2006.01)
*H04L 1/00*      (2006.01)
(Continued)

(52) U.S. Cl.
CPC ......... *H04B 7/0639* (2013.01); *H04L 1/0003* (2013.01); *H04L 5/0094* (2013.01);
(Continued)

(58) Field of Classification Search
CPC ... H04B 7/0639; H04L 1/0003; H04L 5/0094; H04W 72/1205
See application file for complete search history.

(56) References Cited

U.S. PATENT DOCUMENTS 10,637,705 B1 *   4/2020   Shattil ................... H04L 5/0021
2011/0096658 A1   4/2011   Yang et al.
(Continued)

FOREIGN PATENT DOCUMENTS

CN   101998429 A   3/2011
CN   101998656 A   3/2011
(Continued)

OTHER PUBLICATIONS

LG Electronics, "Discussion on codebook based transmission for UL," 3GPP TSG RAN WG1 Meeting#88bis, R1-1704873, Spokane, USA, Apr. 3-7, 2017, 8 pages.
(Continued)

*Primary Examiner* — Jaison Joseph
(74) *Attorney, Agent, or Firm* — Slater Matsil, LLP

(57) ABSTRACT

Embodiments of this application provide a data transmission method and apparatus. The method includes: sending, by a network device, first information by using first signaling, where the first information is used to indicate a quantity N of transmitted precoding matrix indicators TPMIs in second signaling; and sending, by the network device, resource scheduling information and the N TPMIs by using the second signaling, where the resource scheduling information is used to indicate n scheduled physical resource blocks PRBs of M PRBs included in a communication bandwidth, all or some of the N TPMIs is used to indicate a precoding matrix of the n PRBs.

20 Claims, 7 Drawing Sheets

(51) Int. Cl.
*H04L 5/00* (2006.01)
*H04W 72/12* (2009.01)

(52) U.S. Cl.
CPC ... *H04W 72/1205* (2013.01); *H04W 72/1289* (2013.01); *H04L 5/0007* (2013.01)

(56) References Cited

U.S. PATENT DOCUMENTS

| | | | |
|---|---|---|---|
| 2015/0373694 A1 | 12/2015 | You et al. | |
| 2017/0311296 A1* | 10/2017 | Onggosanusi | H04B 7/0404 |
| 2018/0123741 A1 | 5/2018 | You et al. | |
| 2018/0146460 A1 | 5/2018 | Lee et al. | |
| 2018/0183503 A1* | 6/2018 | Rahman | H04W 72/042 |
| 2018/0287682 A1* | 10/2018 | Kwak | H04B 7/0695 |
| 2019/0174567 A1* | 6/2019 | Kusashima | H04W 76/15 |

FOREIGN PATENT DOCUMENTS

| | | |
|---|---|---|
| CN | 102111197 A | 6/2011 |
| CN | 102111889 A | 6/2011 |
| CN | 102196570 A | 9/2011 |
| CN | 104737479 A | 6/2015 |
| CN | 104798329 A | 7/2015 |
| EP | 2779516 A1 | 9/2014 |

OTHER PUBLICATIONS

Samsung, "UL codebook-based transmission," 3GPP TSG RAN WG1 88bis, R1-1705335, Spokane, USA, Apr. 3-7, 2017, 6 pages.

* cited by examiner

First TTI      Second TTI

DATA TRANSMISSION METHOD AND APPARATUS

CROSS-REFERENCE TO RELATED APPLICATIONS

This application is a continuation of International Application No. PCT/CN2018/085427, filed on May 3, 2018, which claims priority to Chinese Patent Application No. 2017103098001.X, filed on May 4, 2017. The disclosures of the aforementioned applications are hereby incorporated by reference in their entireties.

TECHNICAL FIELD

Embodiments of this application relate to the communications field, and in particular, to a data transmission method and apparatus in the communications field.

BACKGROUND

To perform uplink communication with a network device, a terminal device needs to occupy a specific time-frequency resource, namely, several subcarriers in several orthogonal frequency division multiplexing (orthogonal frequency division multiplexing, OFDM) symbols. One subcarrier in an OFDM symbol is referred to as one resource element (resource element, RE). One physical resource block (physical resource block, PRB) includes a plurality of REs in a plurality of OFDM symbols. For example, in a long term evolution (long term evolution, LTE) system, one PRB includes 12 consecutive REs by seven OFDM symbols. Before sending data to a network device, a terminal device with a plurality of transmit antennas needs to precode the data. The network device may precode one layer of to-be-sent data, to increase received power of the data at the terminal device, or may precode a plurality of layers of to-be-sent data, to reduce interference between the plurality of layers of data and improve data transmission performance. Precoding selection is related to a channel, and the channel is frequency-selective. There are different channels on different REs in one OFDM symbol, and therefore the terminal device needs to use different precoding matrices. The precoding matrices used by the terminal device may be notified by the network device. In the LTE system, in consideration of a relatively small uplink bandwidth, the terminal device uses a same precoding matrix at the entire uplink bandwidth.

In a next-generation communications system, a bandwidth for uplink communication is very large, for example, 100 MHz, and channels differ greatly in the entire bandwidth. If a same precoding matrix is used in the entire bandwidth, a high performance loss is caused. Therefore, the uplink communication supports frequency selective fading, to be specific, different precoding matrices may be used on different PRBs. Channels on several adjacent PRBs are similar, and therefore the terminal device may use a same precoding matrix on the adjacent PRBs.

When the network device performs scheduling for the terminal device to transmit uplink data, the network device may first notify the terminal device of resource scheduling (resource allocation, RA) information by using downlink control information (downlink control information, DCI), to indicate a scheduled PRB (for example, "1" indicates scheduled, and "0" indicates not scheduled) in an entire uplink bandwidth of the terminal device. In addition, the network device notifies, by using the DCI, the terminal device of a TPMI used on the scheduled PRB.

Because a quantity of scheduled PRBs in the RA changes dynamically and may vary with each subframe, a quantity of TPMIs that need to be notified to the terminal device by the network device also changes dynamically. Consequently, a quantity of bits in the DCI used to indicate the TPMI is not fixed, and the terminal device can receive, only in a blind detection manner, the TPMI sent by the network device. This results in relatively high complexity.

SUMMARY

A data transmission method and apparatus provided in embodiments of this application help reduce complexity of blindly detecting, by a terminal device, signaling used to transmit a TPMI, thereby improving system performance.

According to a first aspect, a data transmission method is provided, including: sending, by a network device, first information by using first signaling, where the first information is used to indicate a quantity N of transmitted precoding matrix indicators TPMIs in second signaling, and N is a positive integer; and sending, by the network device, resource scheduling information and the N TPMIs by using the second signaling, where the resource scheduling information is used to indicate n scheduled physical resource blocks PRBs of M PRBs included in a communication bandwidth, all or some of the N TPMIs are used to indicate a precoding matrix of the n PRBs, the $i^{th}$ TPMI of the N TPMIs is used to indicate a precoding matrix of $x_i$ PRBs of the M PRBs, $i\in\{1, \ldots, N\}$, M, n, and $x_i$ are all positive integers, $x_1 + \ldots + x_N \leq M$, and n is less than or equal to M.

In the data transmission method in this embodiment of this application, before sending the TPMIs by using the second signaling, the network device first indicates the quantity of TPMIs in the second signaling by using the first signaling, so that a terminal device may first determine the quantity of TPMIs in the second signaling based on the first signaling and then receive the corresponding quantity of TPMIs in the second signaling. This helps reduce complexity of blindly detecting, by the terminal device, the signaling used to transmit the TPMIs, thereby reducing power consumption of the terminal device and improving system performance.

It should be understood that the communication bandwidth is a bandwidth used when the terminal device performs uplink communication with the network device, and the communication bandwidth is not necessarily a system bandwidth. In a possible implementation, the communication bandwidth may be configured based on a capability of the terminal device after the terminal device accesses the network device, and remains unchanged in an entire communications process; and the communication bandwidth is less than the system bandwidth in size. In addition, when a plurality of terminal devices communicate with the network device, each of the plurality of terminal devices may have a unique communication bandwidth. However, this is not limited in this embodiment of this application.

The network device may indicate a same TPMI for adjacent PRBs. PRBs using a same TPMI are considered as a group of PRBs that is referred to as a precoding resource block group (precoding resource block group, PRG). A quantity of PRBs included in a PRG is referred to as a PRG size. Therefore, the $i^{th}$ TPMI of the N TPMIs may be used to indicate the precoding matrix of the $x_i$ PRBs of the M PRBs (to be specific, the $i^{th}$ TPMI is associated with the $x_i$ PRBs of the M PRBs, and a corresponding PRG size is $x_i$), where, i∈{1, . . . , N}, and M, n, and $x_i$ are all positive integers. Optionally, $x_i=x$, to be specific, PRG sizes corresponding to all the TPMIs are the same. However, this is not limited in this embodiment of this application. The PRG size $x_i$ may be a value preset in a system, or may be notified to the terminal device by the network device by using signaling (for example, RRC, a MAC CE, or DCI). Optionally, a value of $x_i$ may be irrelevant to a value of N and/or a value of n. However, this is not limited in this embodiment of this application.

In a first possible implementation of the first aspect, the first signaling is radio resource control RRC signaling or multiple access control control element MAC CE signaling.

The RRC signaling and the MAC CE signaling do not require blind detection. Therefore, the RRC signaling or the MAC CE signaling is configured, to determine information related to N, so that the terminal device may first determine the value of N, thereby reducing complexity of blindly detecting the second signaling by the terminal device.

In addition, the RRC signaling and the MAC CE signaling are not frequently configured, and the value of N configured by the network device remains unchanged in a period of time. Therefore, in this period of time, the terminal device can blindly detect the second signaling based on the value of N. After a condition (for example, a buffer state buffer state of the terminal device or a status of scheduling for a plurality of other terminal devices in the communication bandwidth) used by the network device to determine the value of N changes, the network device may determine whether the value of N needs to be changed. If the value of N needs to be changed, the network device may reconfigure the information related to N by using the first signaling, so that the terminal device updates the value of N and blindly detects the subsequent second signaling based on updated N. It should be understood that to avoid frequently sending the first signaling, the network device needs to properly configure the value of N. However, this is not limited in this embodiment of this application.

With reference to the foregoing possible implementation of the first aspect, in a second possible implementation of the first aspect, the second signaling is downlink control information DCI.

Specifically, the network device may send the second signaling by using the downlink control information (downlink control information, DCI). Because the terminal device has learned of the value of N based on the first signaling, a speed of detecting the DCI is increased. In addition, the resource scheduling information changes dynamically, and a TPMI also needs to be updated dynamically based on a channel state. Therefore, the N TPMIs are placed in the DCI, to improve transmission performance.

In this way, the first signaling is used to assist the terminal device in determining the quantity of TPMIs in the second signaling, so that complexity of blindly detecting the DCI by the terminal device can be greatly reduced, thereby reducing power consumption of the terminal device and improving a speed of blindly detecting the DCI by the terminal device.

With reference to the foregoing possible implementations of the first aspect, in a third possible implementation of the first aspect, the first information is a value of N; or the first information includes a quantity of bits in a TPMI field in the second signaling, and the quantity of bits in the TPMI field corresponds to the quantity N of TPMIs; or the first information includes a bandwidth with m PRBs, and the m PRBs are associated with the N TPMIs, where m is a positive integer, and m is less than M.

In a possible implementation, the network device may use a direct indication manner, to be specific, the first information is set to the value of N. In another possible implementation, the network device may use an indirect indication manner. However, this is not limited in this embodiment of this application. For example, if a PRG size is 2, to be specific, one TPMI is used to indicate a precoding matrix of two PRBs, a relationship between N and m may be $$N = \left\lceil \frac{m}{2} \right\rceil.$$

It should be understood that the network device may alternatively indicate N in another manner. This is not limited in this embodiment of this application.

With reference to the foregoing possible implementations of the first aspect, in a fourth possible implementation of the first aspect, when $x_1 + \ldots + x_N > n$, p TPMIs of the N TPMIs are used to indicate the precoding matrix of the n PRBs, where p is a positive integer, and p is less than N.

Optionally, the network device may notify the other N-p unused TPMIs in a zero padding manner. Optionally, the network device may alternatively notify the other N-p TPMIs in a repetition manner. For example, the other N-p TPMIs are set to be equal to the $p^{th}$ TPMI. However, this is not limited in this embodiment of this application.

With reference to the foregoing possible implementations of the first aspect, in a fifth possible implementation of the first aspect, any one of remaining N-p TPMIs other than the p TPMIs of the N TPMIs is equal to any one of the p TPMIs.

With reference to the foregoing possible implementations of the first aspect, in a sixth possible implementation of the first aspect, when $x_1 + \ldots + x_N \leq n$, the N TPMIs are used to indicate the precoding matrix of the n PRBs, the n PRBs are classified into N PRB groups, each of the N PRB groups includes at least one PRB, and each of the N TPMIs is used to indicate a precoding matrix of one of the N PRB groups.

Specifically, each of the N TPMIs is associated with at least one PRB. Therefore, when a total quantity of PRBs associated with the N TPMIs is less than or equal to the n scheduled PRBs, the N TPMIs may be used to indicate the precoding matrix of the n PRBs. The network device may classify the n PRBs into the N PRB groups, and use each of the N TPMIs to indicate the precoding matrix of one of the N PRB groups, to be specific, all PRBs in the PRB group use a same TPMI.

It should be understood that $x_1 + \ldots + x_N \leq n$ is merely a possible condition, and should constitute no limitation to this embodiment of this application. When $x_1 + \ldots + x_N < n$, all of the N TPMIs may be used to indicate the precoding matrix of the n PRBs, and this depends on a PRG to which the n scheduled PRBs belong.

With reference to the foregoing possible implementations of the first aspect, in a seventh possible implementation of the first aspect, quantities of PRBs included in N-k PRB groups of the N PRB groups are respectively $z_1, \ldots,$ and $z_{N-k}$, there are $i_1, \ldots, i_{N-K} \in \{1, \ldots, N\}$ that meet a condition in which $z_1 = x_{i_1}, z_2 = x_{i_2}, \ldots,$ and $z_{N-k} = x_{i_{N-k}}$, quantities of PRBs included in k PRB groups other than the N-k PRB groups of the N PRB groups are respectively $y_1, \ldots, y_k,$ and $y_1, \ldots,$ and $y_k$ are all positive integers and meet a condition in which $y_1 + \ldots + y_k = n - x_1 - \ldots - x_{N-k}$, where k is a positive integer less than N; or a quantity of PRBs included in each of N-k' PRB groups of the N PRB groups is $$\left\lceil \frac{n}{N} \right\rceil,$$

quantities of PRBs included in k' PRB groups other than the N–k' PRB groups of the N PRB groups are y'$_1$, ..., and y'$_{k'}$, and y'$_1$, ..., and y'$_{k'}$ are positive integers and meet a condition in which $$y'_1 + \ldots + y'_{k'} = n - (N - k')\left\lceil \frac{n}{N} \right\rceil,$$

where k' is a positive integer less than N.

In the foregoing embodiment, the n PRBs may be classified into the N PRB groups in a plurality of manners. This is not limited in this embodiment of this application. Optionally, the quantity of PRBs included in each of the N–k' PRB groups of the N PRB groups is $$\left\lfloor \frac{n}{N} \right\rfloor,$$

the quantities of PRBs included in the k' PRB groups other than the N–k' PRB groups of the N PRB groups are y'$_1$, ..., and y'$_{k'}$, and y'$_1$, ..., and y'$_{k'}$ are positive integers and meet the condition in which $$y'_1 + \ldots + y'_{k'} = n - (N - k')\left\lfloor \frac{n}{N} \right\rfloor.$$

With reference to the foregoing possible implementations of the first aspect, in an eighth possible implementation of the first aspect, $x_1 + \ldots + x_N < M$.

In this way, the network device may not need to notify the terminal device of all TPMIs corresponding to an uplink communication bandwidth of the terminal device, so that a quantity of notified TPMIs can be reduced, thereby reducing signaling overheads for the TPMIs.

According to a second aspect, another data transmission method is provided, including: receiving, by a terminal device, first signaling, where the first signaling includes first information, the first information is used to indicate a quantity N of transmitted precoding matrix indicators TPMIs in second signaling, and N is a positive integer; receiving, by the terminal device, the second signaling based on the first signaling, where the second signaling is used to indicate resource scheduling information of the terminal device and the N TPMIs, the resource scheduling information is used to indicate n scheduled physical resource blocks PRBs of M PRBs included in a communication bandwidth, all or some of the N TPMIs are used to indicate a precoding matrix of the n PRBs, the i$^{th}$ TPMI of the N TPMIs is used to indicate a precoding matrix of x$_i$ PRBs of the M PRBs, i∈{1, ..., N}, M, n, and x$_i$ are all positive integers, $x_1 + \ldots + x_N \leq M$, and n is less than or equal to M; and precoding, by the terminal device, to-be-sent data by using the corresponding precoding matrix on the n PRBs based on the resource scheduling information and the N TPMIs.

In the data transmission method in this embodiment of this application, before sending the TPMIs by using the second signaling, a network device first indicates the quantity of TPMIs in the second signaling by using the first signaling, so that the terminal device may first determine the quantity of TPMIs in the second signaling based on the first signaling and then receive the corresponding quantity of TPMIs in the second signaling. This helps reduce complexity of blindly detecting, by the terminal device, the signaling used to transmit the TPMIs, thereby reducing power consumption of the terminal device and improving system performance.

In a first possible implementation of the second aspect, the first signaling is radio resource control RRC signaling or multiple access control control element MAC CE signaling.

With reference to the foregoing possible implementation of the second aspect, in a second possible implementation of the second aspect, the second signaling is downlink control information DCI.

With reference to the foregoing possible implementations of the second aspect, in a third possible implementation of the second aspect, the first information is a value of N; or the first information includes a quantity of bits in a TPMI field in the second signaling, and the quantity of bits in the TPMI field corresponds to the quantity N of TPMIs; or the first information includes a bandwidth with m PRBs, and the m PRBs are associated with the N TPMIs, where m is a positive integer, and m is less than M.

With reference to the foregoing possible implementations of the second aspect, in a fourth possible implementation of the second aspect, when $x_1 + \ldots + x_N > n$, p TPMIs of the N TPMIs are used to indicate the precoding matrix of the n PRBs, where p is a positive integer, and p is less than N.

With reference to the foregoing possible implementations of the second aspect, in a fifth possible implementation of the second aspect, any one of remaining N–p TPMIs other than the p TPMIs of the N TPMIs is equal to any one of the p TPMIs.

With reference to the foregoing possible implementations of the second aspect, in a sixth possible implementation of the second aspect, when $x_1 + \ldots + x_N \leq n$, the N TPMIs are used to indicate the precoding matrix of the n PRBs, the n PRBs are classified into N PRB groups, each of the N PRB groups includes at least one PRB, and each of the N TPMIs is used to indicate a precoding matrix of one of the N PRB groups.

With reference to the foregoing possible implementations of the second aspect, in a seventh possible implementation of the second aspect, quantities of PRBs included in N–k PRB groups of the N PRB groups are respectively z$_1$, ..., and z$_{N-k}$, there are i$_1$, ..., i$_{N-k}$∈{1, ..., N} that meet a condition in which $z_1 = x_{i_1}, z_2 = x_{i_2}, \ldots,$ and $z_{N-k} = x_{i_{N-k}}$, quantities of PRBs included in k PRB groups other than the N–k PRB groups of the N PRB groups are respectively y$_1$, ..., and y$_k$, and y$_1$, ..., and y$^k$ are all positive integers and meet a condition in which $y_1 + \ldots + y_k = n - x_1 - \ldots - x_{N-k}$, where k is a positive integer less than N; or a quantity of PRBs included in each of N–k' PRB groups of the N PRB groups is $$\left\lceil \frac{n}{N} \right\rceil,$$

quantities of PRBs included in k' PRB groups other than the N–k' PRB groups of the N PRB groups are y'$_1$, ..., and y'$_{k'}$, and y'$_1$, ..., and y'$_{k'}$, are positive integers and meet a condition in which $$y'_1 + \ldots + y'_{k'} = n - (N - k')\left\lceil \frac{n}{N} \right\rceil,$$

where k' is a positive integer less than N.

With reference to the foregoing possible implementations of the second aspect, in an eighth possible implementation of the second aspect, $x_1 + \ldots + x_N \leq M$.

According to a third aspect, a data transmission method is provided, including: determining, by a network device, resource scheduling information and N first transmitted precoding matrix indicators TPMIs, where the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, M, N, and n are all positive integers, n is less than or equal to M, N is independent of n, and N is less than a quantity of TPMIs used to indicate a precoding matrix of the M PRBs; determining, by the network device, a first modulation and coding scheme MCS, where the first MCS is an MCS used when the N first TPMIs are used on the n PRBs; and sending, by the network device, the resource scheduling information, the N TPMIs, and the first MCS by using first signaling In the data transmission method in this embodiment of this application, the quantity of TPMIs sent by the network device in the first signaling is decoupled from the quantity of scheduled PRBs, so that the quantity of TPMIs does not change with the quantity of scheduled PRBs, thereby reducing complexity of blindly detecting the first signaling by a terminal device. The network device sends the first TPMIs corresponding to the scheduled PRBs to the terminal device by using the first signaling, so that the terminal device may first preprocess to-be-sent data by using the corresponding first MCS based on the first signaling.

It should be understood that the network device and the terminal device may agree in advance on a quantity of TPMIs to be sent in the first signaling, so that the terminal device no longer blindly detects the quantity of TPMIs from the network device, thereby reducing complexity of receiving the TPMIs.

In a first possible implementation of the third aspect, the sending, by the network device, the resource scheduling information, the N TPMIs, and the first MCS by using first signaling includes: determining, by the network device, a second MCS, where the second MCS is an MCS used when the N first TPMIs and/or the P second TPMIs are used on the n PRBs, the P second TPMIs are used to indicate a precoding matrix of a PRB in a second PRB set, the second PRB set includes all or some of the M PRBs, and P is a positive integer; and sending, by the network device, the resource scheduling information, the N TPMIs, the first MCS, and the second MCS by using the first signaling.

Specifically, the network device may further determine the second MCS. The second MCS is determined based on the resource scheduling information, the N first TPMIs, and/or the P second TPMIs. Each of the P second TPMIs corresponds to at least one of the M PRBs included in the communication bandwidth. In this embodiment of this application, all PRBs corresponding to the P second TPMIs are referred to as the second PRB set. When no PRB in the second PRB set is included in the first PRB set, the network device may determine the second MCS based on the resource scheduling information, the N first TPMIs, and the P second TPMIs. When the second PRB set is a subset of the first PRB set, the network device may determine the second MCS based on the resource scheduling information and the P second TPMIs. This is not limited in this embodiment of this application. It should be understood that in this embodiment of this application, both a quantity of PRBs in the first PRB set and a quantity of PRBs in the second PRB set are less than or equal to M.

With reference to the foregoing possible implementation of the third aspect, in a second possible implementation of the third aspect, the second PRB set is a subset of the first PRB set, and the second PRB set includes the n PRBs; or the PRB included in the second PRB set is different from the PRB included in the first PRB set.

It should be understood that the N first TPMIs and the P second TPMIs may be associated with different quantities of PRBs. This is not limited in this embodiment of this application.

With reference to the foregoing possible implementations of the third aspect, in a third possible implementation of the third aspect, the first signaling is downlink control information DCI.

With reference to the foregoing possible implementations of the third aspect, in a fourth possible implementation of the third aspect, after the sending, by the network device, the resource scheduling information, the N TPMIs, and the first MCS by using first signaling, the method further includes: sending, by the network device, the P second TPMIs by using second signaling.

With reference to the foregoing possible implementations of the third aspect, in a fifth possible implementation of the third aspect, the second signaling is carried on a downlink shared channel PDSCH; or the second signaling is any one of downlink control information DCI and multiple access control control element MAC CE signaling.

According to a fourth aspect, another data transmission method is provided, including: receiving, by a terminal device, first signaling, where the first signaling is used to indicate resource scheduling information of the terminal device, N first transmitted precoding matrix indicators TPMIs, and a first modulation and coding scheme MCS, the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, the first MCS is an MCS used when the N first TPMIs are used on the n PRBs, n, M, and N are all positive integers, n is less than or equal to M, N is independent of n, and N is less than a quantity of TPMIs used to indicate a precoding matrix of the M PRBs; and preprocessing, by the terminal device, to-be-sent data based on the resource scheduling information, the N first TPMIs, and the first MCS.

In a first possible implementation of the fourth aspect, the second PRB set is a subset of the first PRB set, and the second PRB set includes the n PRBs; or a PRB included in the second PRB set is different from the PRB included in the first PRB set.

With reference to the foregoing possible implementation of the fourth aspect, in a second possible implementation of the fourth aspect, the first signaling is downlink control information DCI.

With reference to the foregoing possible implementations of the fourth aspect, in a third possible implementation of the fourth aspect, the preprocessing, by the terminal device, to-be-sent data based on the resource scheduling information, the N first TPMIs, and the first MCS includes: modulating, by the terminal device, the to-be-sent data based on the first MCS, to obtain first data; and precoding, by the terminal device, the first data by using the N first TPMIs on the n PRBs.

With reference to the foregoing possible implementations of the fourth aspect, in a fourth possible implementation of the fourth aspect, the first signaling is further used to indicate a second MCS, where the second MCS is an MCS used when the N first TPMIs and/or P second TPMIs are used on the n PRBs, the P second TPMIs are used to indicate a precoding matrix of the PRB in the second PRB set, the second PRB set includes all or some of the M PRBs, and P is a positive integer.

With reference to the foregoing possible implementations of the fourth aspect, in a fifth possible implementation of the fourth aspect, the preprocessing, by the terminal device, to-be-sent data based on the resource scheduling information, the N first TPMIs, and the first MCS further includes: modulating, by the terminal device, the to-be-sent data based on the second MCS, to obtain second data.

With reference to the foregoing possible implementations of the fourth aspect, in a sixth possible implementation of the fourth aspect, the method further includes: receiving, by the terminal device, second signaling, where the second signaling is used to indicate the P second TPMIs; and the preprocessing, by the terminal device, to-be-sent data based on the resource scheduling information, the N first TPMIs, and the first MCS further includes: precoding, by the terminal device, the second data by using the P second TPMIs or the N first TPMIs and the P second TPMIs on the n PRBs.

With reference to the foregoing possible implementations of the fourth aspect, in a seventh possible implementation of the fourth aspect, the second signaling is carried on a downlink shared channel PDSCH; or the second signaling is any one of downlink control information DCI and multiple access control control element MAC CE signaling.

According to a fifth aspect, a data transmission apparatus is provided, where the data transmission apparatus is configured to perform the method according to any one of the first aspect or the possible implementations of the first aspect. Specifically, the apparatus includes a unit configured to perform the method according to any one of the first aspect or the possible implementations of the first aspect.

According to a sixth aspect, a data transmission apparatus is provided, where the data transmission apparatus is configured to perform the method according to any one of the second aspect or the possible implementations of the second aspect. Specifically, the apparatus includes a unit configured to perform the method according to any one of the second aspect or the possible implementations of the second aspect.

According to a seventh aspect, a data transmission apparatus is provided, where the data transmission apparatus is configured to perform the method according to any one of the third aspect or the possible implementations of the third aspect. Specifically, the apparatus includes a unit configured to perform the method according to any one of the third aspect or the possible implementations of the third aspect.

According to an eighth aspect, a data transmission apparatus is provided, where the data transmission apparatus is configured to perform the method according to any one of the fourth aspect or the possible implementations of the fourth aspect. Specifically, the apparatus includes a unit configured to perform the method according to any one of the fourth aspect or the possible implementations of the fourth aspect.

According to a ninth aspect, a data transmission apparatus is provided, where the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to transmit a signal. When the processor executes the instruction stored in the memory, the processor is enabled to perform the method according to any one of the first aspect or the possible implementations of the first aspect.

According to a tenth aspect, a data transmission apparatus is provided, where the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to transmit a signal. When the processor executes the instruction stored in the memory, the processor is enabled to perform the method according to any one of the second aspect or the possible implementations of the second aspect.

According to an eleventh aspect, a data transmission apparatus is provided, where the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to transmit a signal. When the processor executes the instruction stored in the memory, the processor is enabled to perform the method according to any one of the third aspect or the possible implementations of the third aspect.

According to a twelfth aspect, a data transmission apparatus is provided, where the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to transmit a signal. When the processor executes the instruction stored in the memory, the processor is enabled to perform the method according to any one of the fourth aspect or the possible implementations of the fourth aspect.

According to a thirteenth aspect, a data transmission system is provided, where the system includes the apparatus according to any one of the fifth aspect or the possible implementations of the fifth aspect and the apparatus according to any one of the sixth aspect or the possible implementations of the sixth aspect; or the system includes the apparatus according to any one of the seventh aspect or the possible implementations of the seventh aspect and the apparatus according to any one of the eighth aspect or the possible implementations of the eighth aspect; or the system includes the apparatus according to any one of the ninth aspect or the possible implementations of the ninth aspect and the apparatus according to any one of the tenth aspect or the possible implementations of the tenth aspect; or the system includes the apparatus according to any one of the eleventh aspect or the possible implementations of the eleventh aspect and the apparatus according to any one of the twelfth aspect or the possible implementations of the twelfth aspect.

According to a fourteenth aspect, a computer readable medium is provided, where the computer readable medium is configured to store a computer program. The computer program includes an instruction used to perform the method according to any one of the first aspect or the possible implementations of the first aspect.

According to a fifteenth aspect, a computer readable medium is provided, where the computer readable medium is configured to store a computer program. The computer program includes an instruction used to perform the method according to any one of the second aspect or the possible implementations of the second aspect.

According to a sixteenth aspect, a computer readable medium is provided, where the computer readable medium is configured to store a computer program. The computer program includes an instruction used to perform the method according to any one of the third aspect or the possible implementations of the third aspect.

According to a seventeenth aspect, a computer readable medium is provided, where the computer readable medium is configured to store a computer program. The computer program includes an instruction used to perform the method according to any one of the fourth aspect or the possible implementations of the fourth aspect.

DETAILED DESCRIPTION OF ILLUSTRATIVE EMBODIMENTS

The following describes the technical solutions in the embodiments of this application with reference to the accompanying drawings in the embodiments of this application.

The technical solutions in the embodiments of this application may be applied to various communications systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5G system.

Figure 1:
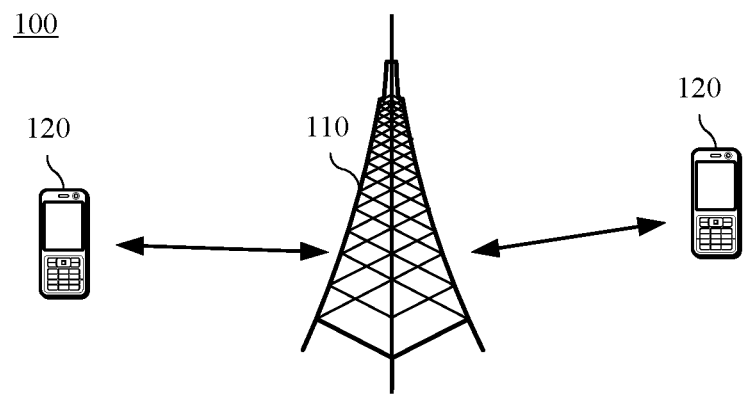
FIG. 1 is a schematic diagram of a communications system according to an embodiment of this application.

FIG. 1 shows a communications system 100 to which an embodiment of this application is applied. The communications system 100 may include at least one network device 110. The network device 100 may be a device, for example, a base station or a base station controller, that communicates with a terminal device. Each network device 100 may provide communication coverage for a particular geographic area, and may communicate with a terminal device (for example, UE) located in the coverage area (a cell). The network device 100 may be a base transceiver station (BTS) in a GSM system or a code division multiple access (CDMA) system, a NodeB (NB) in a WCDMA system, an evolved NodeB (evolutional Node B, eNB or eNodeB) in an LTE system, or a radio controller in a cloud radio access network (CRAN). Alternatively, the network device may be a relay station, an access point, a vehicle-mounted device, a wearable device, a network side device in a future 5G network, a network device in a future evolved public land mobile network (PLMN), or the like.

The wireless communications system 100 further includes a plurality of terminal devices 120 in a coverage area of the network device 110. The terminal device 120 may be mobile or fixed. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

FIG. 1 illustratively shows one network device and two terminal devices. Optionally, the communications system 100 may include a plurality of network devices, and a coverage area of each network device may include another quantity of terminal devices. This is not limited in this embodiment of this application.

Optionally, the wireless communications system 100 may further include other network entities such as a network controller and a mobility management entity. This is not limited in this embodiment of this application.

Figure 2:
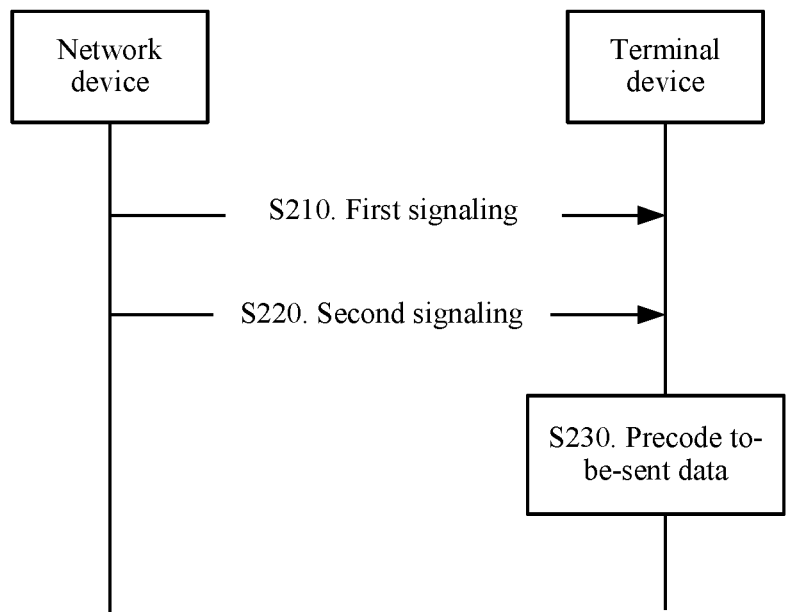
FIG. 2 is a schematic flowchart of a data transmission method according to an embodiment of this application.

FIG. 2 is a schematic flowchart of a data transmission method 200 according to an embodiment of this application. The method 200 may be applied to the communications system 100 shown in FIG. 1. However, this embodiment of this application is not limited thereto.

S210. A network device sends first information by using first signaling, where the first information is used to indicate a quantity N of transmitted precoding matrix indicators TPMIs in second signaling, and N is a positive integer.

Correspondingly, a terminal device receives the first signaling sent by the network device, where the first signaling is used to indicate the first information, and the terminal device obtains the first information based on the first signaling.

S220. The network device sends resource scheduling information and the N TPMIs by using the second signaling, where the resource scheduling information is used to indicate n scheduled physical resource blocks PRBs of M PRBs included in a communication bandwidth, all or some of the N TPMIs are used to indicate a precoding matrix of the n PRBs, the $i^{th}$ TPMI of the N TPMIs is used to indicate a precoding matrix of $x_i$ PRBs of the M PRBs, $i \in \{1, \ldots, N\}$, M, n, and $x_i$ are all positive integers, $x_1 + \ldots + x_N \leq M$, and n is less than or equal to M.

Correspondingly, the terminal device receives, based on the first signaling, the second signaling sent by the network device, where the second signaling is used to indicate the resource scheduling information and the N TPMIs, and the terminal device obtains the resource scheduling information and the N TPMIs based on the second signaling.

In an optional embodiment, $x_1 + \ldots + x_N < M$. In this way, the network device does not need to notify the terminal device of all TPMIs corresponding to an uplink communication bandwidth of the terminal device, so that a quantity of notified TPMIs can be reduced, thereby reducing signaling overheads for the TPMIs.

S230. The terminal device precodes to-be-sent data by using the corresponding precoding matrix on the n PRBs based on the resource scheduling information and the N TPMIs.

Specifically, the network device may first send, to the terminal device by using the first signaling, the first information used to indicate the quantity N of TPMIs in the second signaling, and then send the resource scheduling information and the N TPMIs to the terminal device by using the second signaling. After receiving the first signaling sent by the network device, the terminal device may first determine the first information, to be specific, determine the quantity N of TPMIs carried in the second signaling. Then the terminal device receives the second signaling sent by the network device, and directly obtains the N TPMIs based on the determined quantity N. All or some of the N TPMIs are used to indicate the precoding matrix of the currently scheduled PRBs. In addition, the terminal device may obtain the resource scheduling information in the second signaling; and determine, based on the resource scheduling information, the n scheduled PRBs of the M PRBs included in the communication bandwidth of the terminal device. After determining the n PBRs and a TPMI associated with each of the n PRBs, the terminal device may precode the to-be-sent data by using the corresponding precoding matrix on the n PRBs.

It should be understood that the communication bandwidth is a bandwidth used when the terminal device performs uplink communication with the network device, and the communication bandwidth is not necessarily a system bandwidth. In a possible implementation, the communication bandwidth may be configured based on a capability of the terminal device after the terminal device accesses the network device, and remains unchanged in an entire communications process; and the communication bandwidth is less than the system bandwidth in size. In addition, when a plurality of terminal devices communicate with the network device, each of the plurality of terminal devices may have a unique communication bandwidth. However, this is not limited in this embodiment of this application.

Channels on adjacent PRBs are similar. Therefore, the network device may indicate a same TPMI for the adjacent PRBs. PRBs using a same TPMI are considered as a group of PRBs that is referred to as a precoding resource block group (PRG). A quantity of PRBs included in a PRG is referred to as a PRG size. Therefore, the $i^{th}$ TPMI of the N TPMIs may be used to indicate the precoding matrix of the $x_i$ PRBs of the M PRBs (to be specific, the $i^{th}$ TPMI is associated with the $x_i$ PRBs of the M PRBs, and a corresponding PRG size is $x_i$), where $i \in \{1, \ldots, N\}$, and M, n, and $x_i$ are all positive integers. Optionally, $x_i = x$, to be specific, PRG sizes corresponding to all the TPMIs are the same. However, this is not limited in this embodiment of this application. The PRG size $x_i$ may be a value preset in a system, or may be notified to the terminal device by the network device by using signaling (for example, RRC, a MAC CE, or DCI). Optionally, a value of $x_i$ may be irrelevant to a value of N and/or a value of n. However, this is not limited in this embodiment of this application.

In this embodiment of this application, to reduce signaling overheads for notifying TPMIs in the second signaling, the network device sends some instead of all of TPMIs associated with the M PRBs included in the communication bandwidth to the terminal device. Therefore, $x_1 + \ldots + x_N < M$, to be specific, a total quantity of PRBs associated with the N TPMIs is less than a quantity of PRBs included in the communication bandwidth. It is unnecessary to notify all the TPMIs corresponding to the M PRBs in the entire communication bandwidth. Therefore, the signaling overheads for the TPMIs in the second signaling are greatly reduced.

A degree to which the signaling overheads are reduced depends on a value of N that is determined by the network device. It should be noted that a smaller value of N means a more significant reduction in the signaling overheads. Specifically, the network device may determine the value of N in a plurality of manners. For example, the network device may determine the value of N based on at least one piece of the following information: a buffer state reported by the terminal device, a status of scheduling for a plurality of other terminal devices in the communication bandwidth, a service type and a requirement of the terminal device, and the like. In an optional embodiment, the network device may determine an upper bound of a bandwidth subsequently scheduled for the terminal device. A quantity of PRBs included in the upper bound is less than the quantity M of PRBs included in the communication bandwidth, and there is a very high probability that the quantity of PRBs included in the upper bound is greater than or equal to a quantity of PRBs scheduled by the network device for the terminal device in a next period of time. In an optional embodiment, the value of N may be alternatively determined in another manner. For example, the value of N is recommended by the terminal device to the network device, and is then comprehensively considered by the network device with reference to a specific case and a requirement of the terminal device. This is not limited in this embodiment of this application.

It should be understood that the network device sends the N TPMIs, so that the terminal device precodes the to-be-sent data by using the corresponding precoding matrix on the n PRBs scheduled by the network device and sends the to-be-sent data to the network device. Therefore, all or some of the N TPMIs are used to indicate the precoding matrix of the n PRBs.

Figure 3:
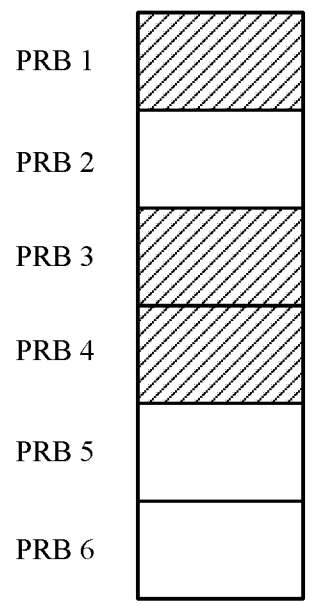
FIG. 3 is a schematic diagram of a correspondence between a PRB and a TPMI according to an embodiment of this application.

An association relationship between the N TPMIs and the n PRBs depends on a PRG size. For ease of understanding, FIG. 3 is used as an example for description below. As shown in FIG. 3, it is assumed that one PRG includes two PRBs, in other words, $x_i=2$. In this case, each of the N TPMIs indicates a precoding matrix of two PRBs. The communication bandwidth of the terminal device includes six PRBs: a PRB 1, a PRB 2, a PRB 3, a PRB 4, a PRB 5, and a PRB 6 respectively. Scheduled PRBs indicated in the resource scheduling information are the PRB 1, the PRB 3, and the PRB 4. The first signaling notifies that N=2, and the second signaling is specifically used to notify two TPMIs. A first TPMI is used to indicate a precoding matrix used on the PRB 1 and the PRB 2, and the second TPMI is used to indicate a precoding matrix used on the PRB 3 and the PRB 4. After receiving the first signaling and the second signaling, the terminal device may precode the to-be-sent data by using the associated precoding matrices on the three scheduled PRBs based on the resource allocation information. Specifically, on the PRB 1, the terminal device may use the precoding matrix indicated by the first TPMI, and on the PRB 3 and the PRB 4, the terminal device may use the precoding matrix indicated by the second TPMI.

In an existing method, when a network device performs scheduling for a terminal device to transmit uplink data, the network device may first notify the terminal device of resource scheduling information by using downlink control information DCI, to indicate a scheduled PRB (for example, "1" indicates scheduled, and "0" indicates not scheduled) in an uplink bandwidth of the terminal device. In addition, the network device notifies, by using the DCI, the terminal device of a TPMI used on the scheduled PRB. In this manner, the network device does not need to notify the terminal device of all TPMIs corresponding to the uplink communication bandwidth of the terminal device, thereby saving signaling overheads for notifying a TPMI corresponding to a PRB that is not scheduled. However, because a quantity of scheduled PRBs indicated by the network device in the resource scheduling information changes dynamically and may vary with each subframe, a quantity of TPMIs that need to be notified to the terminal device by the network device also changes dynamically. Consequently, a quantity of bits used to indicate a TPMI is not fixed in the DCI. Consequently, the quantity of bits in the DCI is not fixed. Because the terminal device does not know the quantity of bits in the DCI, the terminal device needs to detect all possible quantities of bits. This greatly increases complexity of blindly detecting the DCI by the terminal device.

In the data transmission method in this embodiment of this application, before sending the TPMIs by using the second signaling, the network device first indicates the quantity of TPMIs in the second signaling by using the first signaling, so that the terminal device may first determine the quantity of TPMIs in the second signaling based on the first signaling and then receive the corresponding quantity of TPMIs in the second signaling. The quantity of TPMIs is already known. This helps reduce complexity of blindly detecting, by the terminal device, the signaling used to transmit the TPMIs, thereby reducing power consumption of the terminal device and improving system performance.

In an optional embodiment, the first signaling is radio resource control RRC signaling or multiple access control control element MAC CE signaling.

Specifically, the first signaling may be the radio resource control (Radio resource control, RRC) signaling or the multiple access control (MAC) control element (CE). The RRC signaling and the MAC CE signaling do not require blind detection. Therefore, the RRC signaling or the MAC CE signaling is configured, to determine information related to N, so that the terminal device may first determine the value of N, thereby reducing complexity of blindly detecting the second signaling by the terminal device.

In addition, the RRC signaling and the MAC CE signaling are not frequently configured, and the value of N configured by the network device remains unchanged in a period of time. Therefore, in this period of time, the terminal device can blindly detect the second signaling based on the value of N. After a condition (for example, the buffer state buffer state of the terminal device or the status of scheduling for the plurality of other terminal devices in the communication bandwidth) used by the network device to determine the value of N changes, the network device may determine whether the value of N needs to be changed. If the value of N needs to be changed, the network device may reconfigure the information related to N by using the first signaling, so that the terminal device updates the value of N and blindly detects the subsequent second signaling based on updated N. It should be understood that to avoid frequently sending the first signaling, the network device needs to properly configure the value of N. However, this is not limited in this embodiment of this application.

In an optional embodiment, the second signaling is downlink control information DCI.

Specifically, the network device may send the second signaling by using the downlink control information (DCI). Because the terminal device has learned of the value of N based on the first signaling, a speed of detecting the DCI is increased. In addition, the resource scheduling information changes dynamically, and a TPMI also needs to be updated dynamically based on a channel state. Therefore, the N TPMIs are placed in the DCI, to improve transmission performance.

In this way, the first signaling is used to assist the terminal device in determining the quantity of TPMIs in the second signaling, so that complexity of blindly detecting the DCI by the terminal device can be greatly reduced, thereby reducing power consumption of the terminal device and improving a speed of blindly detecting the DCI by the terminal device.

In an optional embodiment, the first information is the value of N; or the first information includes a quantity of bits in a TPMI field in the second signaling, and the quantity of bits in the TPMI field corresponds to the quantity N of TPMIs; or the first information includes a bandwidth with m PRBs, and the m PRBs are associated with the N TPMIs, where m is a positive integer, and m is less than M.

Specifically, the network device may indicate the quantity N of TPMIs in the second signaling to the terminal device in a plurality of manners. In a possible implementation, the network device may use a direct indication manner, to be specific, the first information is set to the value of N. In another possible implementation, the network device may use an indirect indication manner. The network device may set the first information to include the quantity of bits in the TPMI field in the second signaling, and the quantity of bits in the TPMI field corresponds to N. After receiving the first information, the terminal device may determine the quantity N of TPMIs in the second signaling based on the quantity of bits in the TPMI field. For example, each TPMI needs to be indicated by using a bits, and in this case, the first signaling indicates that a quantity of bits of the TPMIs in the second signaling is Na. Alternatively, the network device may set the first information to include the bandwidth with m PRBs, and the m PRBs are associated with the N TPMIs. After receiving the first information, the terminal device may determine the quantity N of TPMIs in the second signaling based on the bandwidth with m PRBs. For example, if a PRG size is 2, to be specific, one TPMI is used to indicate a precoding matrix of two PRBs, a relationship between N and m may be $$N = \left\lceil \frac{m}{2} \right\rceil.$$

It should be understood that the network device may alternatively indicate N in another manner. This is not limited in this embodiment of this application In an optional embodiment, when $x_1+\ldots+x_N>n$, p TPMIs of the N TPMIs are used to indicate the precoding matrix of the n PRBs, where p is a positive integer, and p is less than N.

Specifically, each of the N TPMIs is associated with at least one PRB. Therefore, when the total quantity of PRBs associated with the N TPMIs is greater than the n scheduled PRBs, the p TPMIs of the N TPMIs may be used to indicate the precoding matrix of the n PRBs.

Optionally, the network device may notify the other N−p unused TPMIs in a zero padding manner. Optionally, the network device may alternatively notify the other N−p TPMIs in a repetition manner. For example, the other N−p TPMIs are set to be equal to the $p^{th}$ TPMI. However, this is not limited in this embodiment of this application.

In an optional embodiment, when the p TPMIs of the N TPMIs are used to indicate the precoding matrix of the n PRBs, any one of the remaining N−p TPMIs other than the p TPMIs of the N TPMIs is equal to any one of the p TPMIs.

Figure 4:
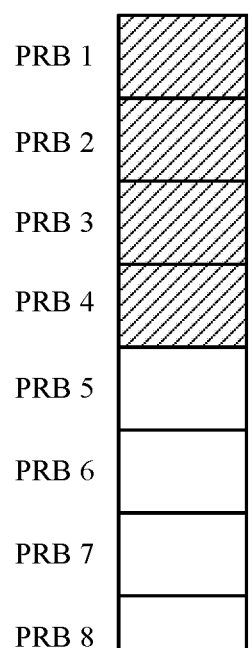
FIG. 4 is a schematic diagram of a correspondence between a PRB and a TPMI according to an embodiment of this application.
Figure 4:
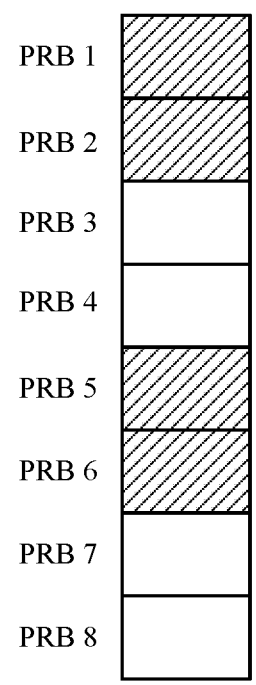

For ease of understanding, FIG. 4 is used as an example for description below. As shown in FIG. 4, the communication bandwidth of the terminal device includes eight PRBs: a PRB 1, a PRB 2, a PRB 3, a PRB 4, a PRB 5, a PRB 6, a PRB 7, and a PRB 8. One PRG includes two PRBs, to be specific, one TPMI may indicate a precoding matrix of two PRBs. The first information notified in the first signaling indicates that N=3, and in this case, three TPMIs are associated with six PRBs.

In a transmission time interval (TTI) corresponding to a first TTI in FIG. 4, the second signaling is used to notify in the resource scheduling information that there are n=4 scheduled PRBs, namely, the PRB 1, the PRB 2, the PRB 3, and the PRB 4, and notify that there are N=3 TPMIs: a TPMI 1, a TPMI 2, and a TPMI 3. The TPMI 1 indicates a precoding matrix of the PRB 1 and the PRB 2, and the TPMI 2 indicates a precoding matrix of the PRB 3 and the PRB 4.

It should be understood that the TPMI 3 is not used in current data transmission by the terminal device. Therefore, the network device may notify the TPMI 3 in a zero padding manner, may notify a TPMI of the PRB 5 and the PRB 6, or may set TPMI 3=TPMI 2, to be specific, indicate the precoding matrix of the PRB 3 and the PRB 4 in the TPMI 3. Optionally, the network device may notify the TPMI 3 in any other manner. This is not limited in this embodiment of this application.

In a next TTI corresponding to a second TI in FIG. 4, the second signaling is used to notify in the resource scheduling information that there are n=4 scheduled PRBs, namely, the PRB 1, the PRB 2, the PRB 5, and the PRB 6, and notify that there are N=3 TPMIs: a TPMI 1, a TPMI 2, and a TPMI 3. The TPMI 1 indicates a precoding matrix of the PRB 1 and the PRB 2, and the TPMI 2 indicates a precoding matrix of the PRB 5 and the PRB 6. The TPMI 3 is not used in current data transmission by the terminal device. Therefore, the network device may notify the TPMI 3 in a zero padding manner, may notify a TPMI of the PRB 7 and the PRB 8, or may set TPMI 3=TPMI 2, to be specific, indicate the precoding matrix of the PRB 3 and the PRB 4 in the TPMI 3. Optionally, the network device may notify the TPMI 3 in any other manner. This is not limited in this embodiment of this application.

It should be further understood that values of N that are configured by the network device in all TIs may be the same, or may be different. In both the first TTI and the second TTI in FIG. 4, N is 3. The network device may determine, at a regular interval, whether the value of N needs to be changed, to minimize signaling overheads for sending a TPMI. However, this is not limited in this embodiment of this application.

In an optional embodiment, when $x_1+\ldots+x_N\leq n$, the N TPMIs are used to indicate the precoding matrix of the n PRBs, the n PRBs are reclassified into N PRB groups, each of the N PRB groups includes at least one PRB, and each of the N TPMIs is used to indicate a precoding matrix of one of the N PRB groups.

Specifically, each of the N TPMIs is associated with at least one PRB. Therefore, when the total quantity of PRBs associated with the N TPMIs is less than or equal to the n scheduled PRBs, the N TPMIs may be used to indicate the precoding matrix of the n PRBs. The network device may classify the n PRBs into the N PRB groups, and use each of the N TPMIs to indicate the precoding matrix of one of the N PRB groups, to be specific, all PRBs in the PRB group use a same TPMI.

It should be understood that $x_1+\ldots+x_N\leq n$ is merely a possible condition, and should constitute no limitation to this embodiment of this application. When $x_1+\ldots+x_N<n$, all of the N TPMIs may be used to indicate the precoding matrix of the n PRBs, and this depends on a PRG to which the n scheduled PRBs belong.

For example, N=3, to be specific, there are three TPMIs: a TPMI 1, a TPMI 2, and a TPMI 3; and there are six corresponding PRBs in total: a PRB 1, a PRB 2, a PRB 3, a PRB 4, a PRB 5, and a PRB 6. The TPMI 1 corresponds to the PRB 1 and the PRB 2, the TPMI 2 corresponds to the PRB 3 and the PRB 4, and the TPMI 3 corresponds to the PRB 5 and the PRB 6 (it may be considered that the PRB 1 and the PRB 2 belong to a PRG 1, the PRB 3 and the PRB 4 belong to a PRG 2, and the PRB 5 and the PRB 6 belong to a PRG 3). In addition, n=3, to be specific, three PRBs are scheduled, and TPMIs corresponding to the three PRBs depend on a PRG to which each of the three PRBs belongs. Specifically, if the three PRBs are the PRB 1, the PRB 2, and the PRB 3, the TPMI 1 and the TPMI 2 of the three TPMIs are used to indicate precoding matrices of the three PRBs. If the three PRBs are the PRB 1, the PRB 3, and the PRB 5, the TPMI 1, the TPMI 2, and the TPMI 3 of the three TPMIs are used to indicate the precoding matrices of the three PRBs.

It should be understood that when some (namely, the TPMI 1 and the TPMI 2) of the three TPMIs are used to indicate the precoding matrices of the three PRBs, the network device may notify remaining TPMIs (namely, the TPMI 3) in a zero padding manner, or set TPMI 3=TPMI 2.

In an optional embodiment, quantities of PRBs included in N−k PRB groups of the N PRB groups are respectively $z_1,\ldots$, and $z_{N-k}$, there are $i_1,\ldots,i_{N-k}\in\{1,\ldots,N\}$ that meet a condition in which $z_1=x_{i_1}, z_2=x_{i_2},\ldots$, and $z_{N-k}=x_{i_{N-k}}$, quantities of PRBs included in k PRB groups other than the N−k PRB groups of the N PRB groups are respectively $y_1,\ldots,y_k$, and $y_1,\ldots$, and $y^k$ are all positive integers and meet a condition in which $y_1+\ldots+y_k=n-x_1-\ldots x_{N-k}$, where k is a positive integer less than N; or a quantity of PRBs included in each of N–k' PRB groups of the N PRB groups is $$\left\lceil \frac{n}{N} \right\rceil,$$

quantities of PRBs included in k' PRB groups other than the N–k' PRB groups of the N PRB groups are y'$_1$, . . . and y'$_{k'}$, and y'$_1$, . . . , and y'$_{k'}$ are positive integers and meet a condition in which $$y'_1 + \ldots + y'_{k'} = n - (N - k')\left\lceil \frac{n}{N} \right\rceil,$$

where k' is a positive integer less than N.

Specifically, in the foregoing embodiment, the n PRBs may be classified into the N PRB groups in a plurality of manners. This is not limited in this embodiment of this application. In a possible implementation, the N–k PRB groups may be selected, and the quantities of PRBs included in the PRB groups are respectively z$_1$, . . . , and z$_{N-k}$ that are in a one-to-one correspondence with any N–k values of x$_1$, . . . , and x$_N$. First N–k PRB groups may correspond to first N–k TPMIs (in other words, z$_1$=x$_1$, . . . , and z$_{N-k}$=x$_{N-k}$), or there may be any other correspondence. This is not limited in this embodiment of this application.

Optionally, the quantity of PRBs included in each of the N–k' PRB groups of the N PRB groups is $$\left\lfloor \frac{n}{N} \right\rfloor,$$

the quantities of PRBs included in the k' PRB groups other than the N–k' PRB groups of the N PRB groups are y'$_1$, . . . , and y'$_{k'}$, and y'$_1$, . . . , and y'$_{k'}$ are positive integers and meet the condition in which $$y'_1 + \ldots + y'_{k'} = n - (N - k')\left\lceil \frac{n}{N} \right\rceil.$$

For example, n=7, and N=5. In this case, the n scheduled PRBs may be classified into five groups, and a specific quantity of PRBs included in each group may be determined in different manners. In a manner of $$\left\lceil \frac{n}{N} \right\rceil,$$

because $$\left\lceil \frac{n}{N} \right\rceil = 2,$$

two PRB groups of the five PRB groups may each include two PRBs, and in this case, k'=2. The remaining three PRB groups may each include one PRB. In a manner of $$\left\lfloor \frac{n}{N} \right\rfloor,$$

because $$\left\lfloor \frac{n}{N} \right\rfloor = 1,$$

four PRB groups of the five PRB groups may each include one PRB, and in this case, k'=4. The remaining one PRB group may include three PRBs.

It should be understood that in different grouping manners, after regrouping, different TPMIs may be associated with different quantities of PRBs, and a quantity of PRBs associated with each TPMI may be different from the original PRG size x$_i$ preset by the network device or configured by using signaling. This is not limited in this embodiment of this application. In an optional embodiment, before the network device sends the first information by using the first signaling, the method further includes: receiving, by the network device, request information sent by the terminal device, where the request information is used to indicate a quantity N$_1$ of TPMIs required by the terminal device, and N$_1$ is a positive integer; and determining, by the network device, N based on the request information.

It should be understood that the network device may configure the quantity N of TPMIs in the second signaling in a plurality of manners. The network device may receive the quantity, of TPMIs required by the terminal device, sent by the terminal device, and determine N with reference to a status of the network device; or may determine N based on information such as a user buffer status, a user scheduling status, and a quality of service (QoS) requirement. This is not limited in this embodiment of this application.

It should be understood that sequence numbers of the foregoing processes do not mean execution sequences. The execution sequences of the processes should be determined based on functions and internal logic of the processes, and should not be construed as any limitation to the implementation processes of the embodiments of this application.

Figure 5:
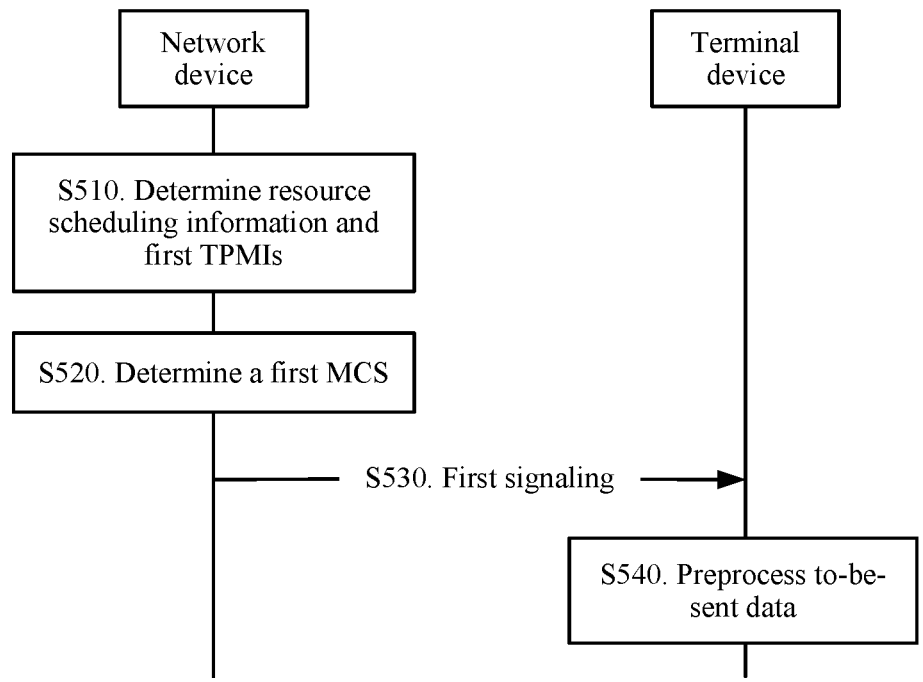
FIG. 5 is a schematic flowchart of another data transmission method according to an embodiment of this application.

FIG. 5 is a schematic flowchart of a data transmission method 500 according to an embodiment of this application. The method 500 may be applied to the communications system 100 shown in FIG. 1. However, this embodiment of this application is not limited thereto.

S510. A network device determines resource scheduling information and N first transmitted precoding matrix indicators TPMIs, where the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, M, N, and n are all positive integers, n is less than or equal to M, N is independent of n, and N is less than a quantity of TPMIs used to indicate a precoding matrix of the M PRBs.

S520. The network device determines a first modulation and coding scheme MCS, where the first MCS is an MCS used when the terminal device uses the precoding matrix corresponding to the N first TPMIs on the n PRBs.

S530. The network device sends the resource scheduling information, the N TPMIs, and the first MCS by using first signaling.

Correspondingly, the terminal device receives the first signaling sent by the network device, and obtains the resource scheduling information, the N TPMIs, and the first MCS based on the first signaling.

S540. The terminal device preprocesses to-be-sent data based on the resource scheduling information, the N first TPMIs, and the first MCS.

Specifically, the network device may determine the resource scheduling information and the N first TPMIs. The resource scheduling information is used to represent the n scheduled PRBs of the M PRBs included in the communication bandwidth. Each of the N first TPMIs corresponds to at least one of the M PRBs included in the communication bandwidth. Therefore, all PRBs corresponding to the N first TPMIs may be referred to as the first PRB set. A value of N is irrelevant to n. It should be understood that the quantity N of first TPMIs may be determined by the network device, may be a preset value, or may be determined according to a preset rule. Optionally, N may be selected based on the total quantity M of PRBs in the communication bandwidth. In a possible implementation, $$N = \left\lceil \frac{M}{c} \right\rceil,$$

where c is a positive integer greater than 1. For example, c=2. A value of c may be preset, or may be notified to the terminal device by the network device by using signaling. The network device may determine the first MCS based on the resource scheduling information and the N first TPMIs. Therefore, the first MCS is used to indicate an MCS used when the N first TPMIs are used on the n scheduled PRBs.

In an optional embodiment, the network device may further determine a second MCS. The second MCS is determined based on the resource scheduling information, the N first TPMIs, and/or P second TPMIs. Each of the P second TPMIs corresponds to at least one of the M PRBs included in the communication bandwidth. In this embodiment of this application, all PRBs corresponding to the P second TPMIs are referred to as a second PRB set. When no PRB in the second PRB set is included in the first PRB set, the network device may determine the second MCS based on the resource scheduling information, the N first TPMIs, and the P second TPMIs. When the second PRB set is a subset of the first PRB set, the network device may determine the second MCS based on the resource scheduling information and the P second TPMIs. This is not limited in this embodiment of this application. It should be understood that in this embodiment of this application, both a quantity of PRBs in the first PRB set and a quantity of PRBs in the second PRB set are less than or equal to M.

After determining the resource scheduling information, the N first TPMIs, the P second TPMIs, and the first MCS, the network device may send the resource scheduling information, the N TPMIs, and the first MCS by using the first signaling, so that the terminal device receives the resource scheduling information, the N TPMIs, and the first MCS, determines the n scheduled PRBs based on the resource scheduling information, and preprocesses the to-be-sent data by using the first MCS and the N first TPMIs when the P second TPMIs are not received.

It should be understood that the communication bandwidth is a bandwidth used when the terminal device performs uplink communication with the network device, and the communication bandwidth is not necessarily a system bandwidth. In a possible implementation, the communication bandwidth may be configured based on a capability of the terminal device after the terminal device accesses the network device, and remains unchanged in an entire communications process; and the communication bandwidth is less than the system bandwidth in size. In addition, when a plurality of terminal devices communicate with the network device, each of the plurality of terminal devices may have a unique communication bandwidth. However, this is not limited in this embodiment of this application.

It should be further understood that the network device and the terminal device may agree in advance on a quantity of TPMIs to be sent in the first signaling, so that the terminal device no longer blindly detects the quantity of TPMIs from the network device, thereby reducing complexity of receiving the TPMIs.

In an existing method, when a network device performs scheduling for a terminal device to transmit uplink data, the network device may first notify the terminal device of resource scheduling information by using downlink control information DCI, to indicate a scheduled PRB (for example, "1" indicates scheduled, and "0" indicates not scheduled) in an uplink bandwidth of the terminal device. In addition, the network device notifies, by using the DCI, the terminal device of a TPMI used on the scheduled PRB. In this manner, the network device does not need to notify the terminal device of all TPMIs corresponding to the uplink communication bandwidth of the terminal device, thereby saving signaling overheads for notifying a TPMI corresponding to a PRB that is not scheduled. However, because a quantity of scheduled PRBs indicated by the network device in the resource scheduling information changes dynamically and may vary with each subframe, a quantity of TPMIs that need to be notified to the terminal device by the network device also changes dynamically. Consequently, a quantity of bits used to indicate a TPMI is not fixed in the DCI, and the terminal device can receive, only in a blind detection manner, the TPMI sent by the network device. This results in relatively high complexity.

In the data transmission method in this embodiment of this application, the quantity of TPMIs sent by the network device in the first signaling is decoupled from the quantity of scheduled PRBs, so that the quantity of TPMIs does not change with the quantity of scheduled PRBs, thereby reducing complexity of blindly detecting the first signaling by the terminal device. The network device sends the first TPMIs corresponding to the scheduled PRBs to the terminal device by using the first signaling, so that the terminal device may first preprocess the to-be-sent data by using the corresponding first MCS based on the first signaling.

In an optional embodiment, the second PRB set is a subset of the first PRB set, and the second PRB set includes the n PRBs; or any PRB included in the second PRB set does not belong to the first PRB set.

It should be understood that the first TPMIs and the second TPMIs may be associated with different quantities of PRBs. This is not limited in this embodiment of this application.

Figure 6:
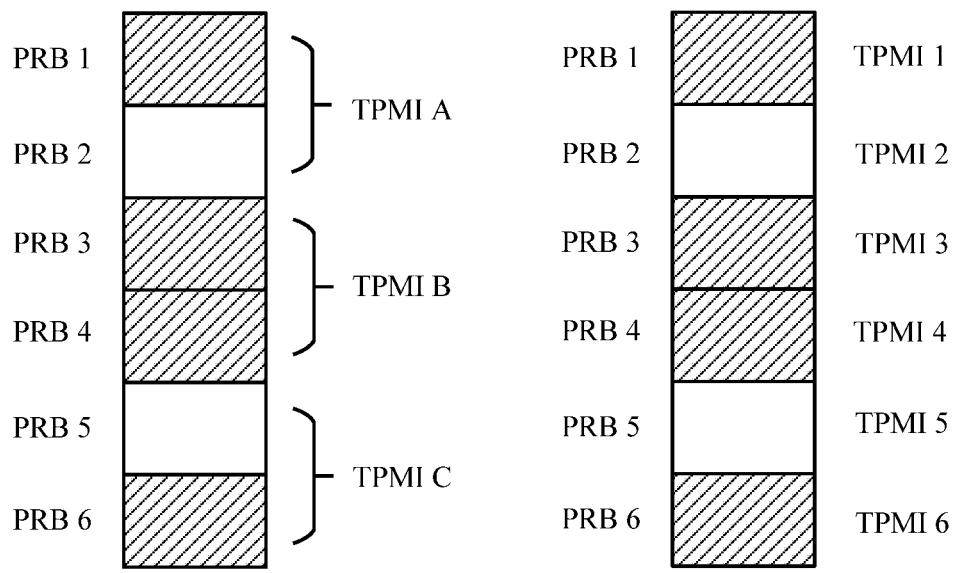
FIG. 6 is a schematic diagram of a correspondence between a PRB and a TPMI according to an embodiment of this application.
Figure 7:
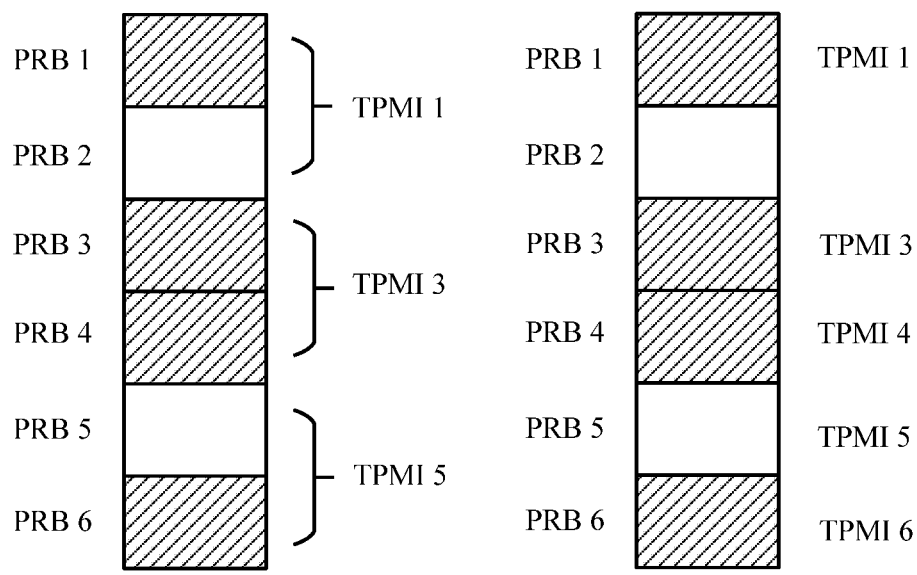
FIG. 7 is a schematic diagram of a correspondence between a PRB and a TPMI according to an embodiment of this application.

For ease of understanding, FIG. 6 and FIG. 7 are used as an example for description below. As shown in FIG. 6 and FIG. 7, the communication bandwidth of the terminal device includes six PRBs: a PRB 1, a PRB 2, a PRB 3, a PRB 4, a PRB 5, and a PRB 6. According to a configuration by the network device or a predefined rule, each TPMI is used to indicate a precoding matrix of one PRB, in other words, an original PRG size is 1. According to a predefined rule, a value of N is a half of the quantity of TPMIs corresponding to the communication bandwidth, in other words, N=6/2=3. Therefore, the network device notifies three first TPMIs by using the first signaling. The first signaling is further used to notify n=4 scheduled PRBs: the PRB 1, the PRB 3, the PRB 4, and the PRB 6.

In FIG. 6, because the value of N is a half of the quantity of TPMIs corresponding to the communication bandwidth, the original PRG size 1 is not applicable to the first TPMIs. Because the value of N is a half of the quantity of TPMIs corresponding to the communication bandwidth, a PRG size corresponding to the first TPMIs is 2. The three first TPMIs are set to a TPMI A, a TPMI B, and a TPMI C. In this case, the TPMI A is obtained through calculation based on both a channel on the PRB 1 and a channel on the PRB 2, the TPMI B is obtained through calculation based on both a channel on the PRB 3 and a channel on the PRB 4, and the TPMI C is obtained based on a channel on the PRB 5 and a channel on the PRB 6. Therefore, the TPMI A is used to indicate a precoding matrix of the PRB 1 and the PRB 2, the TPMI B is used to indicate a precoding matrix of the PRB 3 and the PRB 4, and the TPMI C is used to indicate a precoding matrix of the PRB 5 and the PRB 6. In comparison with the original PRG size, precoding is performed on data at a relatively coarse frequency domain granularity by using the three first TPMIs. The second TPMI indicates a precoding matrix for each scheduled PRB. Therefore, a PRG size corresponding to the second TPMI is consistent with the original PRG size, and the second PRB set includes the n scheduled PRBs. Because the four scheduled PRBs are the PRB 1, the PRB 3, the PRB 4, and the PRB 6, the P second TPMIs are a TPMI 1, a TPMI 3, a TPMI 4, and a TPMI 6. In this embodiment, the PRG size corresponding to the second TPMI is 1. The second TPMI is used to precode data at a relatively fine frequency domain granularity. Because the first TPMI indicates a precoding matrix of all PRBs in the entire communication bandwidth, the second PRB set is a subset of the first PRB set.

In FIG. 7, because the value of N is a half of the quantity of TPMIs corresponding to the communication bandwidth, the first signaling is used to notify a half of N=6, namely, three first TPMIs. Different from FIG. 6, a PRG size corresponding to the first TPMIs is consistent with the original PRG size, and is 1. Therefore, the network device directly notifies TPMIs corresponding to three PRBs in the six PRBs. For example, the network device notifies TPMIs, namely, a TPMI 1, a TPMI 3, and a TPMI 5, of the PRB 1, the PRB 3, and the PRB 5 respectively. To be specific, the TPMI 1 is obtained through calculation based on a channel on the PRB 1, the TPMI 3 is obtained through calculation based on a channel on the PRB 3, and the TPMI 5 is obtained through calculation based on a channel on the PRB 5. Therefore, the first PRB set includes the PRB 1, the PRB 3, and the PRB 5. Because TPMIs of the PRB 2, the PRB 4, and the PRB 6 are not notified, if one or more of the PRBs are scheduled, the terminal device may precode data on the PRB or PRBs by using a precoding matrix or precoding matrices corresponding to any one or more of the three notified TPMIs. In FIG. 7, the PRB 4 and the PRB 6 are scheduled. Therefore, the terminal device may precode data by using a precoding matrix corresponding to the TPMI 3 on the PRB 4, and may precode data by using a precoding matrix corresponding to the TPMI 5 on the PRB 6. Because the PRB 3 and the PRB 4 are adjacent to each other, and channel features are relatively similar, a performance loss of precoding data by using the precoding matrix corresponding to the TPMI 3 on the PRB 4 may be relatively low. Likewise, a performance loss of precoding data by using the precoding matrix corresponding to the TPMI 5 on the PRB 6 may be relatively low. Therefore, it may also be considered that the TPMI 1 is used to indicate a precoding matrix of the PRB 1 and the PRB 2, the TPMI 3 is used to indicate a precoding matrix of the PRB 3 and the PRB 4, and the TPMI 5 is used to indicate a precoding matrix of the PRB 5 and the PRB 6. In this case, the second TPMI needs to be used to notify only a TPMI of a PRB, of the n scheduled PRBs, whose TPMI is not notified, in other words, any PRB included in the second PRB set does not belong to the first PRB set. In FIG. 7, the network device may notify only the TPMI 4 and the TPMI 6 by using second signaling, and the TPMI 4 and the TPMI 6 are the second TPMIs. The PRB 4 and the PRB 6 constitute the second PRB set.

In an optional embodiment, the first signaling is downlink control information DCI.

Specifically, the network device may send the first signaling by using the downlink control information (DCI). The resource scheduling information changes dynamically, and a TPMI also needs to be updated dynamically based on a channel state. Therefore, the N TPMIs are placed in the DCI, to improve transmission performance.

In an optional embodiment, that the terminal device preprocesses to-be-sent data based on the resource scheduling information, the N first TPMIs, and the first MCS includes: modulating, by the terminal device, the to-be-sent data based on the first MCS, to obtain first data; and precoding, by the terminal device, the first data by using the N first TPMIs on the n PRBs.

Specifically, the terminal device may determine the n scheduled PRBs, the first MCS, and the N first TPMIs based on the first signaling, and modulate the to-be-sent data based on the first MCS, to obtain the first data. Then, the terminal device determines the precoding matrix by using the N first TPMIs, and precodes the modulated first data on the corresponding PRB.

In an optional embodiment, the first signaling is further used to indicate the second MCS. The second MCS is an MCS used when the N first TPMIs and/or the P second TPMIs are used on the n PRBs, the P second TPMIs are used to indicate a precoding matrix of a PRB in the second PRB set, the second PRB set includes all or some of the M PRBs, and P is a positive integer.

In an optional embodiment, that the terminal device preprocesses to-be-sent data based on the resource scheduling information, the N first TPMIs, and the first MCS further includes: modulating, by the terminal device, the to-be-sent data based on the second MCS, to obtain second data.

Specifically, because modulation is performed before precoding, the network device may separately send the second MCS and the P second TPMIs, in other words, first send the second MCS. After receiving the second MSC, the terminal device may modulate the data based on the second MCS. The modulation step may be performed before the P second TPMIs are received, so that a processing speed of the terminal device can be increased, thereby improving system performance.

In an optional embodiment, after the network device sends the resource scheduling information, the N TPMIs, and the first MCS by using the first signaling, the method further includes: sending, by the network device, the P second TPMIs by using second signaling.

Correspondingly, the method further includes: receiving, by the terminal device, the second signaling, where the second signaling is used to indicate the P second TPMIs; and that the terminal device preprocesses to-be-sent data based on the resource scheduling information, the N first TPMIs, and the first MCS further includes: precoding, by the terminal device, the second data by using the P second TPMIs or the N first TPMIs and the P second TPMIs on the n PRBs.

Specifically, after sending the resource scheduling information, the N first TPMIs, the first MCS, and the second MCS by using the first signaling, the network device may send the P second TPMIs by using the second signaling. The terminal device receives the P second TPMIs, and precodes the second data in a corresponding manner. Optionally, the two manners in FIG. 6 and FIG. 7 may be included. Details are not described herein again.

In this embodiment of this application, when receiving the P second TPMIs, the terminal device has completed modulation and coding of the to-be-sent data based on the second MCS, and only needs to precode the data based on the P second TPMIs and/or the N first TPMIs. In this way, a processing speed of the terminal device can be increased, thereby improving system performance.

In an optional embodiment, the second signaling is carried on a downlink shared channel PDSCH; or the second signaling is any one of downlink control information DCI and multiple access control control element MAC CE signaling.

Specifically, the network device may send the second signaling by using any one of the downlink shared channel (PDSCH), radio resource control (RRC) signaling, and the multiple access control (MAC) control element (CE). This is not limited in this embodiment of this application.

In uplink transmission, downlink resource scheduling does not necessarily occur in each subframe. Therefore, when the second signaling is indicated on the PDSCH, or the second signaling is the RRC or the MAC CE, if downlink resource scheduling occurs in a current subframe, the network device may precode uplink data by using the second MCS based on the P second TPMIs and/or the N first TPMIs, to improve uplink transmission performance. If no downlink resource scheduling occurs in the current subframe, the network device may precode the uplink data based on only the N first TPMIs and the first MCS.

It should be understood that sequence numbers of the foregoing processes do not mean execution sequences. The execution sequences of the processes should be determined based on functions and internal logic of the processes, and should not be construed as any limitation to the implementation processes of the embodiments of this application.

The data transmission method according to the embodiments of this application is described above in detail with reference to FIG. 1 to FIG. 7. A data transmission apparatus according to the embodiments of this application is described below in detail with reference to FIG. 8 to FIG. 15.

Figure 8:
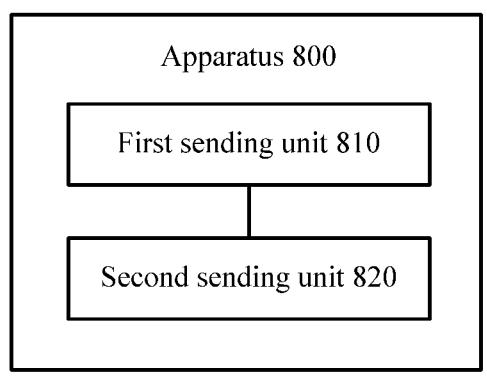
FIG. 8 is a schematic block diagram of a data transmission apparatus according to an embodiment of this application.

FIG. 8 shows a data transmission apparatus 800 according to an embodiment of this application. The apparatus 800 includes: a first sending unit 810, configured to send first information by using first signaling, where the first information is used to indicate a quantity N of transmitted precoding matrix indicators TPMIs in second signaling, and N is a positive integer; and a second sending unit 820, configured to send resource scheduling information and the N TPMIs by using the second signaling, where the resource scheduling information is used to indicate n scheduled physical resource blocks PRBs of M PRBs included in a communication bandwidth, all or some of the N TPMIs are used to indicate a precoding matrix of the n PRBs, the $i^{th}$ TPMI of the N TPMIs is used to indicate a precoding matrix of $x_i$ PRBs of the M PRBs, $i \in \{1, \ldots, N\}$, M, n, and $x_i$ are all positive integers, $x_1 + \ldots + x_N \leq M$, and n is less than or equal to M.

Optionally, the first signaling is radio resource control RRC signaling or multiple access control control element MAC CE signaling.

Optionally, the second signaling is downlink control information DCI.

Optionally, the first information is a value of N; or the first information includes a quantity of bits in a TPMI field in the second signaling, and the quantity of bits in the TPMI field corresponds to the quantity N of TPMIs; or the first information includes a bandwidth with m PRBs, and the m PRBs are associated with the N TPMIs, where m is a positive integer, and m is less than M.

Optionally, when $x_1 + \ldots + x_N >$, p TPMIs of the N TPMIs are used to indicate the precoding matrix of the n PRBs, where p is a positive integer, and p is less than N.

Optionally, any one of N−p TPMIs other than the p TPMIs of the N TPMIs is equal to any one of the p TPMIs.

Optionally, when $x_1 + \ldots + x_N \leq n$, the N TPMIs are used to indicate the precoding matrix of the n PRBs, the n PRBs are classified into N PRB groups, each of the N PRB groups includes at least one PRB, and each of the N TPMIs is used to indicate a precoding matrix of one of the N PRB groups.

Optionally, quantities of PRBs included in N−k PRB groups of the N PRB groups are respectively $z_1, \ldots$ and $z_{N-k}$, there are $i_1, \ldots i_{N-k} \in \{1, \ldots, N\}$ that meet a condition in which $z_1 = x_{i_1}, z_2 = x_{i_2}, \ldots$ and $z_{N-k} = x_{i_{N-k}}$, quantities of PRBs included in k PRB groups other than the N−k PRB groups of the N PRB groups are respectively $y_1, \ldots,$ and $y_k$, and $y_1, \ldots,$ and $y_k$ are all positive integers and meet a condition in which $y_1 + \ldots + y_k = n - x_1 - \ldots - x_{N-k}$, where k is a positive integer less than N; or a quantity of PRBs included in each of N−k' PRB groups of the N PRB groups is $$\lceil \frac{n}{N} \rceil,$$

quantities of PRBs included in k' PRB groups other than the N−k' PRB groups of the N PRB groups are $y'_1, \ldots,$ and $y'_{k'}$, and $y'_1, \ldots,$ and $y'_{k'}$ are positive integers and meet a condition in which $$y'_1 + \ldots + y'_{k'} = n - (N - k') \lceil \frac{n}{N} \rceil,$$

where k' is a positive integer less than N.

It should be understood that the apparatus 800 herein is embodied in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 800 may be specifically the network device in the foregoing embodiments, and the apparatus 800 may be configured to perform the procedures and/or the steps corresponding to the network device in the foregoing method embodiments. To avoid repetition, details are not described herein again.

Figure 9:
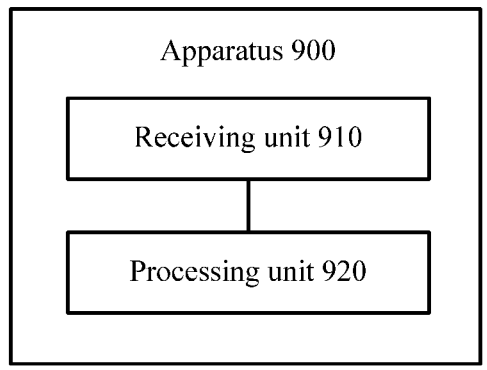
FIG. 9 is a schematic block diagram of another data transmission apparatus according to an embodiment of this application.

FIG. 9 shows another data transmission apparatus 900 according to an embodiment of this application. The apparatus 900 includes: a receiving unit 910, configured to receive first signaling, where the first signaling includes first information, the first information is used to indicate a quantity N of transmitted precoding matrix indicators TPMIs in second signaling, and N is a positive integer, where the receiving unit 910 is further configured to: receive the second signaling based on the first signaling, where the second signaling is used to indicate resource scheduling information of the terminal device and the N TPMIs, the resource scheduling information is used to indicate n scheduled physical resource blocks PRBs of M PRBs included in a communication bandwidth, all or some of the N TPMIs are used to indicate a precoding matrix of the n PRBs, the $i^{th}$ TPMI of the N TPMIs is used to indicate a precoding matrix of $x_i$ PRBs of the M PRBs, $i \in \{1, \ldots, N\}$, M, n, and $x_i$ are all positive integers, $x_1 + \ldots + x_N \leq M$, and n is less than or equal to M; and a processing unit 920, configured to precode to-be-sent data by using the corresponding precoding matrix on the n PRBs based on the resource scheduling information and the N TPMIs.

Optionally, the first signaling is radio resource control RRC signaling or multiple access control control element MAC CE signaling.

Optionally, the second signaling is downlink control information DCI.

Optionally, the first information is a value of N; or the first information includes a quantity of bits in a TPMI field in the second signaling, and the quantity of bits in the TPMI field corresponds to the quantity N of TPMIs; or the first information includes a bandwidth with m PRBs, and the m PRBs are associated with the N TPMIs, where m is a positive integer, and m is less than M.

Optionally, when $x_1 + \ldots + x_N > n$, p TPMIs of the N TPMIs are used to indicate the precoding matrix of the n PRBs, where p is a positive integer, and p is less than N.

Optionally, any one of N−p TPMIs other than the p TPMIs of the N TPMIs is equal to any one of the p TPMIs.

Optionally, when $x_1 + \ldots + x_N \leq n$, the N TPMIs are used to indicate the precoding matrix of the n PRBs, the n PRBs are classified into N PRB groups, each of the N PRB groups includes at least one PRB, and each of the N TPMIs is used to indicate a precoding matrix of one of the N PRB groups.

Optionally, quantities of PRBs included in N−k PRB groups of the N PRB groups are respectively $z_1, \ldots$ and $z_{N-k}$, there are $i_1, \ldots, i_{N-k} \in \{1, \ldots, N\}$ that meet a condition in which $z_1 = x_{i_1}, z_2 = x_{i_2}, \ldots,$ and $z_{N-k} = x_{i_{N-k}}$, quantities of PRBs included in k PRB groups other than the N−k PRB groups of the N PRB groups are respectively $y_1, \ldots,$ and $y_k$, and $y_1, \ldots,$ and $y_k$ are all positive integers and meet a condition in which $y_1 + \ldots + y_k = n - x_1 - \ldots - x_{N-k}$, where k is a positive integer less than N; or a quantity of PRBs included in each of N−k' PRB groups of the N PRB groups is $$\lceil \frac{n}{N} \rceil,$$

quantities of PRBs included in k' PRB groups other than the N−k' PRB groups of the N PRB groups are $y'_1, \ldots,$ and $y'_{k'}$, and $y'_1, \ldots,$ and $y'_{k'}$ are positive integers and meet a condition in which $$y'_1 + \ldots + y'_{k'} = n - (N - k') \lceil \frac{n}{N} \rceil,$$

where k' is a positive integer less than N.

It should be understood that the apparatus 900 herein is embodied in a form of function units. The term "unit" herein may be an application-specific integrated circuit (application specific integrated circuit, ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 900 may be specifically the terminal device in the foregoing embodiments, and the apparatus 900 may be configured to perform the procedures and/or the steps corresponding to the terminal device in the foregoing method embodiments. To avoid repetition, details are not described herein again.

Figure 10:
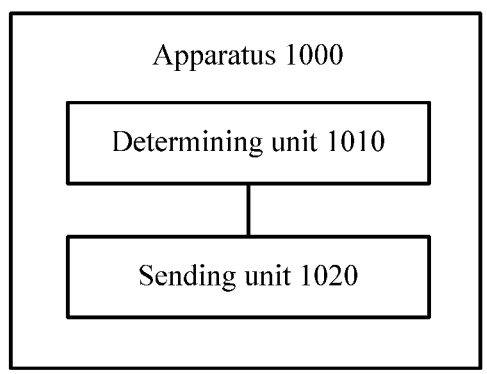
FIG. 10 is a schematic block diagram of another data transmission apparatus according to an embodiment of this application.

FIG. 10 shows a data transmission apparatus 1000 according to an embodiment of this application. The apparatus 1000 includes: a determining unit 1010, configured to determine resource scheduling information and N first transmitted precoding matrix indicators TPMIs, where the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, M, N, and n are all positive integers, n is less than or equal to M, N is independent of n, and N is less than a quantity of TPMIs used to indicate a precoding matrix of the M PRBs, where the determining unit 1010 is further configured to: determine a first modulation and coding scheme MCS, where the first MCS is an MCS used when the N first TPMIs are used on the n PRBs; and a sending unit 1020, configured to send the resource scheduling information, the N TPMIs, and the first MCS by using first signaling.

Optionally, the determining unit 1010 is further configured to determine a second MCS. The second MCS is an MCS used when the N first TPMIs and/or the P second TPMIs are used on the n PRBs, the P second TPMIs are used to indicate a precoding matrix of a PRB in a second PRB set, the second PRB set includes all or some of the M PRBs, and P is a positive integer.

The sending unit 1020 is specifically configured to send the resource scheduling information, the N TPMIs, the first MCS, and the second MCS by using the first signaling.

Optionally, the second PRB set is a subset of the first PRB set, and the second PRB set includes the n PRBs; or any PRB included in the second PRB set does not belong to the first PRB set.

Optionally, the first signaling is downlink control information DCI.

Optionally, the sending unit 1020 is further configured to send the P second TPMIs by using second signaling after sending the resource scheduling information, the N TPMIs, and the first MCS by using the first signaling.

Optionally, the second signaling is carried on a downlink shared channel PDSCH; or the second signaling is any one of downlink control information DCI and multiple access control control element MAC CE signaling.

It should be understood that the apparatus 1000 herein is embodied in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 1000 may be specifically the network device in the foregoing embodiments, and the apparatus 1000 may be configured to perform the procedures and/or the steps corresponding to the network device in the foregoing method embodiments. To avoid repetition, details are not described herein again.

Figure 11:
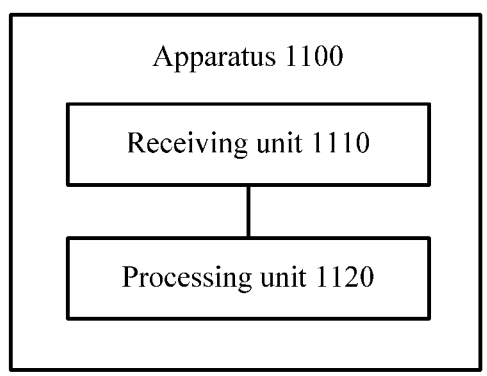
FIG. 11 is a schematic block diagram of another data transmission apparatus according to an embodiment of this application.

FIG. 11 shows another data transmission apparatus 1100 according to an embodiment of this application. The apparatus 1100 includes: a receiving unit 1110, configured to receive first signaling, where the first signaling is used to indicate resource scheduling information of the terminal device, N first transmitted precoding matrix indicators TPMIs, and a first modulation and coding scheme MCS, the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, the first MCS is an MCS used when the N first TPMIs are used on the n PRBs, n, M, and N are all positive integers, n is less than or equal to M, N is independent of n, and N is less than a quantity of TPMIs used to indicate a precoding matrix of the M PRBs; and a processing unit 1120, configured to preprocess to-be-sent data based on the resource scheduling information, the N first TPMIs, and the first MCS.

Optionally, the second PRB set is a subset of the first PRB set, and the second PRB set includes the n PRBs; or any PRB included in the second PRB set does not belong to the first PRB set.

Optionally, the first signaling is downlink control information DCI.

Optionally, the processing unit 1120 is further configured to: modulate the to-be-sent data based on the first MCS, to obtain first data; and precode the first data by using the N first TPMIs on the n PRBs.

Optionally, the first signaling is further used to indicate a second MCS. The second MCS is an MCS used when the N first TPMIs and/or P second TPMIs are used on the n PRBs, the P second TPMIs are used to indicate a precoding matrix of a PRB in the second PRB set, the second PRB set includes all or some of the M PRBs, and P is a positive integer.

Optionally, the processing unit 1120 is further configured to modulate the to-be-sent data based on the second MCS, to obtain second data.

Optionally, the receiving unit 1110 is further configured to receive second signaling, where the second signaling is used to indicate the P second TPMIs.

Optionally, the receiving unit 1110 is further configured to receive second signaling, where the second signaling is used to indicate the P second TPMIs; and the processing unit 1120 is further configured to precode the second data by using the P second TPMIs or the N first TPMIs and the P second TPMIs on the n PRBs.

Optionally, the second signaling is carried on a downlink shared channel PDSCH; or the second signaling is any one of downlink control information DCI and multiple access control control element MAC CE signaling.

It should be understood that the apparatus 1100 herein is embodied in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 1100 may be specifically the terminal device in the foregoing embodiments, and the apparatus 1100 may be configured to perform the procedures and/or the steps corresponding to the terminal device in the foregoing method embodiments. To avoid repetition, details are not described herein again.

Figure 12:
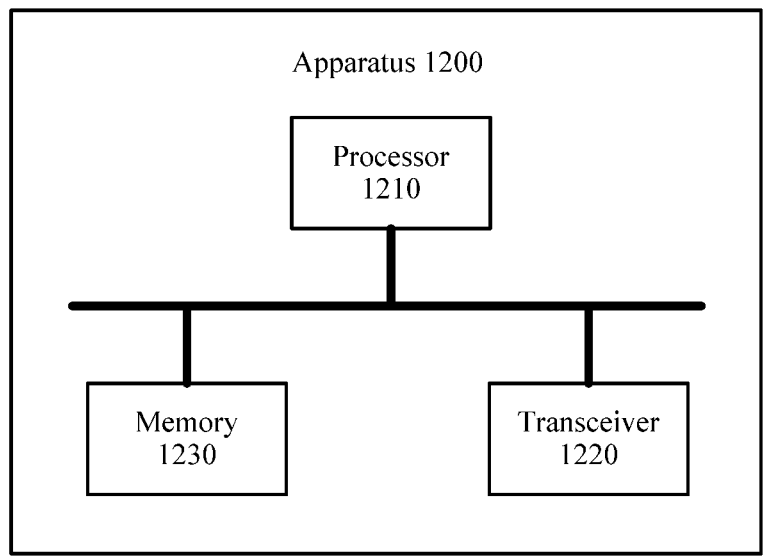
FIG. 12 is a schematic block diagram of another data transmission apparatus according to an embodiment of this application.

FIG. 12 shows another data transmission apparatus 1200 according to an embodiment of this application. The apparatus 1200 includes a processor 1210, a transceiver 1220, and a memory 1230. The processor 1210, the transceiver 1220, and the memory 1230 communicate with each other by using an internal connection path. The memory 1230 is configured to store an instruction. The processor 1210 is configured to execute the instruction stored in the memory 1230, to control the transceiver 1220 to send a signal and/or receive a signal.

The transceiver 1220 is configured to send first information by using first signaling. The first information is used to indicate a quantity N of transmitted precoding matrix indicators TPMIs in second signaling, and N is a positive integer.

The transceiver 1220 is further configured to send resource scheduling information and the N TPMIs by using the second signaling. The resource scheduling information is used to indicate n scheduled physical resource blocks PRBs of M PRBs included in a communication bandwidth, all or some of the N TPMIs are used to indicate a precoding matrix of the n PRBs, the $i^r$ TPMI of the N TPMIs is used to indicate a precoding matrix of $x_i$ PRBs of the M PRBs, $i \in \{1, \ldots, N\}$, M, n, and $x_i$ are all positive integers, $x_1 + \ldots + x_N \le M$, and n is less than or equal to M.

It should be understood that the apparatus 1200 may be specifically the network device in the foregoing embodiments, and may be configured to perform the steps and/or the procedures corresponding to the network device in the foregoing method embodiments. Optionally, the memory 1230 may include a read-only memory and a random access memory, and provide the instruction and data to the processor. A part of the memory may further include a nonvolatile random access memory. For example, the memory may further store information about a device type. The processor 1210 may be configured to execute the instruction stored in the memory. In addition, when the processor 1210 executes the instruction stored in the memory, the processor 1210 is configured to perform the steps and/or the procedures corresponding to the network device in the foregoing method embodiments.

Figure 13:
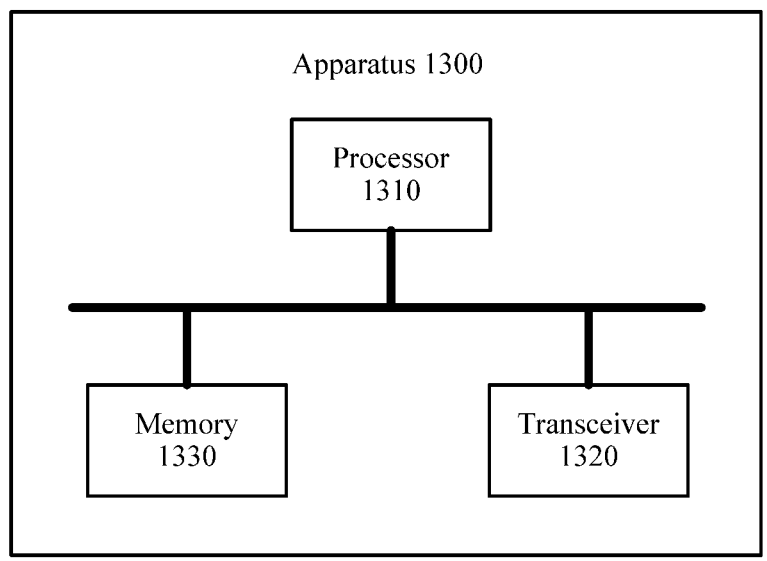
FIG. 13 is a schematic block diagram of another data transmission apparatus according to an embodiment of this application.

FIG. 13 shows another data transmission apparatus 130000 according to an embodiment of this application. The apparatus 1300 includes a processor 1310, a transceiver 1320, and a memory 13300. The processor 1310, the transceiver 1320, and the memory 1330 communicate with each other by using an internal connection path. The memory 1330 is configured to store an instruction. The processor 1310 is configured to execute the instruction stored in the memory 1330, to control the transceiver 1320 to send a signal and/or receive a signal.

The transceiver 1320 is configured to receive first signaling, where the first signaling includes first information, the first information is used to indicate a quantity N of transmitted precoding matrix indicators TPMIs in second signaling, and N is a positive integer.

The transceiver 1320 is further configured to receive the second signaling based on the first signaling, where the second signaling is used to indicate resource scheduling information of the terminal device and the N TPMIs, the resource scheduling information is used to indicate n scheduled physical resource blocks PRBs of M PRBs included in a communication bandwidth, all or some of the N TPMIs are used to indicate a precoding matrix of the n PRBs, the $i^{th}$ TPMI of the N TPMIs is used to indicate a precoding matrix of $x_i$ PRBs of the M PRBs, $i \in \{1, \ldots, N\}$, M, n, and $x_i$ are all positive integers, $x_1 + \ldots + x_N \leq M$, and n is less than or equal to M.

The processor 1310 is configured to precode to-be-sent data by using the corresponding precoding matrix on the n PRBs based on the resource scheduling information and the N TPMIs.

It should be understood that the apparatus 1300 may be specifically the terminal device in the foregoing embodiments, and may be configured to perform the steps and/or the procedures corresponding to the terminal device in the foregoing method embodiments. Optionally, the memory 1330 may include a read-only memory and a random access memory, and provide the instruction and data to the processor. A part of the memory may further include a nonvolatile random access memory. For example, the memory may further store information about a device type. The processor 1310 may be configured to execute the instruction stored in the memory. In addition, when the processor 1310 executes the instruction stored in the memory, the processor 1310 is configured to perform the steps and/or the procedures corresponding to the terminal device in the foregoing method embodiments.

Figure 14:
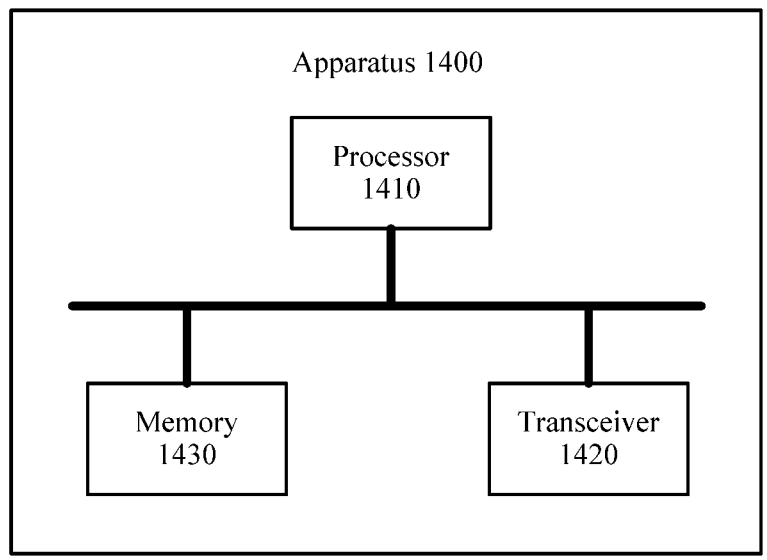
FIG. 14 is a schematic block diagram of another data transmission apparatus according to an embodiment of this application.

FIG. 14 shows another data transmission apparatus 140000 according to an embodiment of this application. The apparatus 1400 includes a processor 1410, a transceiver 1420, and a memory 14300. The processor 1410, the transceiver 1420, and the memory 1430 communicate with each other by using an internal connection path. The memory 1430 is configured to store an instruction. The processor 1410 is configured to execute the instruction stored in the memory 1430, to control the transceiver 1420 to send a signal and/or receive a signal.

The processor 1410 is configured to determine resource scheduling information and N first transmitted precoding matrix indicators TPMIs, where the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, M, N, and n are all positive integers, n is less than or equal to M, N is independent of n, and N is less than a quantity of TPMIs used to indicate a precoding matrix of the M PRBs.

The processor 1410 is further configured to determine a first modulation and coding scheme MCS, where the first MCS is an MCS used when the N first TPMIs are used on the n PRBs.

The transceiver 1420 is configured to send the resource scheduling information, the N TPMIs, and the first MCS by using first signaling.

It should be understood that the apparatus 1400 may be specifically the network device in the foregoing embodiments, and may be configured to perform the steps and/or the procedures corresponding to the network device in the foregoing method embodiments. Optionally, the memory 1430 may include a read-only memory and a random access memory, and provide the instruction and data to the processor. A part of the memory may further include a nonvolatile random access memory. For example, the memory may further store information about a device type. The processor 1410 may be configured to execute the instruction stored in the memory. In addition, when the processor 1410 executes the instruction stored in the memory, the processor 1410 is configured to perform the steps and/or the procedures corresponding to the network device in the foregoing method embodiments.

Figure 15:
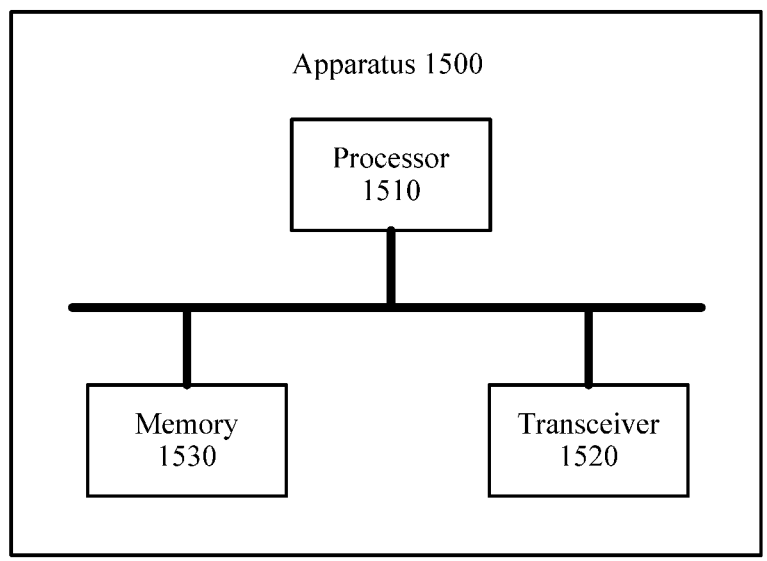
FIG. 15 is a schematic block diagram of another data transmission apparatus according to an embodiment of this application.

FIG. 15 shows another data transmission apparatus 1500 according to an embodiment of this application. The apparatus 1500 includes a processor 1510, a transceiver 1520, and a memory 15300. The processor 1510, the transceiver 1520, and the memory 1530 communicate with each other by using an internal connection path. The memory 1530 is configured to store an instruction. The processor 1510 is configured to execute the instruction stored in the memory 1530, to control the transceiver 1520 to send a signal and/or receive a signal.

The transceiver 1520 is configured to receive first signaling, where the first signaling is used to indicate resource scheduling information of the terminal device, N first transmitted precoding matrix indicators TPMIs, and a first modulation and coding scheme MCS, the resource scheduling information is used to indicate n scheduled physical resource blocks PRBs of M PRBs included in a communication bandwidth, the N first TPMIs are used to indicate a precoding matrix of a PRB in a first PRB set, the first PRB set includes all or some of the M PRBs, the first MCS is an MCS used when the N first TPMIs are used on the n PRBs, n, M, and N are all positive integers, n is less than or equal to M, N is independent of n, and N is less than a quantity of TPMIs used to indicate a precoding matrix of the M PRBs.

The processor 1510 is configured to preprocess to-be-sent data based on the resource scheduling information, the N first TPMIs, and the first MCS.

It should be understood that the apparatus 1500 may be specifically the terminal device in the foregoing embodiments, and may be configured to perform the steps and/or the procedures corresponding to the terminal device in the foregoing method embodiments. Optionally, the memory 1530 may include a read-only memory and a random access memory, and provide the instruction and data to the processor. A part of the memory may further include a nonvolatile random access memory. For example, the memory may further store information about a device type. The processor 1510 may be configured to execute the instruction stored in the memory. In addition, when the processor 1510 executes the instruction stored in the memory, the processor 1510 is configured to perform the steps and/or the procedures corresponding to the terminal device in the foregoing method embodiments.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, the steps in the foregoing methods may be implemented by using an integrated logic circuit of hardware in the processor, or by using an instruction in a form of software. The steps in the methods disclosed with reference to the embodiments of this application may be directly performed by a hardware processor, or may be performed by using a combination of the hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads the instruction in the memory and completes the steps in the foregoing methods in combination with the hardware in the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that in combination with the embodiments disclosed in this specification, the method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to the corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps in the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a terminal device, a first signaling, wherein the first signaling comprises first information, the first information indicating a quantity N of precoding matrix indicators (TPMIs) to be transmitted in a second signaling, and N being a positive integer; and
after receiving the first signaling, receiving, by the terminal device, the second signaling based on the first signaling, the second signaling comprising resource scheduling information of the terminal device and the second signaling comprising the N TPMIs, the resource scheduling information indicating a quantity n of scheduled physical resource blocks (PRBs) of a quantity M of PRBs comprised in a communication bandwidth, wherein the n PRBs are classified into N PRB groups, each of the N PRB groups comprises at least one PRB, the N TPMIs indicate N precoding matrices of the n PRBs, and each of the N TPMIs indicates a respective corresponding precoding matrix of a corresponding PRB group of the N PRB groups.

2. The method according to claim 1, wherein:
the first information is an integer value of the quantity N.

3. The method according to claim 1, wherein an $i^{th}$ TPMI of the N TPMIs indicates a corresponding precoding matrix of x, PRBs of the M PRBs, $i \in \{1, \ldots, N\}$, M, n, and x, are all positive integers, $x_1 + \ldots + x_N \leq M$, quantities of PRBs comprised in N-k PRB groups of the N PRB groups are respectively $z_1, \ldots,$ and $z_{N-k}$, where $z_1 = x_{i_1}, z_2 = x_{i_2}, \ldots,$ and $z_{N-k} = x_{i_{N-k}}$, quantities of PRBs comprised in k PRB groups other than the N-k PRB groups of the N PRB groups are respectively $y_1, \ldots,$ and $y_k$, $y_1, \ldots,$ and $y_k$ are all positive integers and meet a condition in which $y_1 + \ldots + y_k = n - x_1 - \ldots - x_{N-k}$, and wherein k is a positive integer less than N.

4. The method according to claim 1, wherein the first information comprises a quantity of bits in a TPMI field in the second signaling, and the quantity of bits in the TPMI field corresponds to the quantity N of TPMIs.

5. The method according to claim 1, wherein the first information comprises a bandwidth with m PRBs, and the m PRBs are associated with the N TPMIs, and wherein m is a positive integer, and m is less than the quantity M.

6. The method according to claim 1, wherein, a quantity of PRBs comprised in each of N-k' PRB groups of the N PRB groups is $$\lceil \frac{n}{N} \rceil,$$

quantities of PRBs comprised in k' PRB groups other than the N-k' PRB groups of the N PRB groups are $y_1'$, ..., and $y_{k'}'$, and $y_1'$, ..., and $y_{k'}'$, are positive integers and meet a condition in which $$y_1' + \ldots + y_{k'}' = n - (N - k') \lceil \frac{n}{N} \rceil,$$

and wherein k' is a positive integer less than N.

7. The method according to claim 1, further comprising:
 precoding, by the terminal device, to-be-sent data based on the resource scheduling information and the N TPMIs.

8. A data transmission apparatus, comprising:
 a transmitter, configured to:
  send first information by using a first signaling, wherein the first information indicates a quantity N of precoding matrix indicators (TPMIs) to be transmitted in a second signaling, and N is a positive integer; and
  after sending the first information, send resource scheduling information and the N TPMIs by using the second signaling, wherein the resource scheduling information indicates a quantity n of scheduled physical resource blocks (PRBs) of a quantity M of PRBs comprised in a communication bandwidth, the n PRBs are classified into N PRB groups, each of the N PRB groups comprises at least one PRB, the N TPMIs indicate N precoding matrices of the N PRBs, and each of the N TPMIs indicates a respective corresponding precoding matrix of a corresponding PRB group of the N PRB groups.

9. The apparatus according to claim 8, wherein:
 the first information is an integer value of the quantity N.

10. The apparatus according to claim 8, wherein an $i^{th}$ TPMI of the N TPMIs indicates a corresponding precoding matrix of x, PRBs of the M PRBs, i∈{1, ..., N}, M, n, and $x_i$ are all positive integers, $x_1 + \ldots x_N \leq +M$, quantities of PRBs comprised in N-k PRB groups of the N PRB groups are respectively $z_1$, ..., and $z_{N-k}$, $z_1 = x_{i_1}$, $z_2 = x_{i_2}$, ..., and $z_{N-k} = x_{i_{N-k}}$, quantities of PRBs comprised in k PRB groups other than the N-k PRB groups of the N PRB groups are respectively and $y_1$, ..., and $y_k$, and $y_1$, ..., and $y_k$ are all positive integers and meet a condition in which $y_1 + \ldots + y_k = n - x_1 - \ldots - x_{N-k}$, and wherein k is a positive integer less than the quantity N.

11. The apparatus according to claim 8, wherein the first information comprises a quantity of bits in a TPMI field in the second signaling, and the quantity of bits in the TPMI field corresponds to the quantity N of TPMIs.

12. The apparatus according to claim 8, wherein the first information comprises a bandwidth with m PRBs, and the m PRBs are associated with the N TPMIs, and wherein m is a positive integer, and m is less than the quantity M.

13. The apparatus according to claim 8, wherein a quantity of PRBs comprised in each of N-k' PRB groups of the N PRB groups is $$\lceil \frac{n}{N} \rceil,$$

quantities of PRBs comprised in k' PRB groups other than the N-k' PRB groups of the N PRB groups are $y_1'$, ..., and $y_{k'}'$, and $y_1'$, ..., and $y_{k'}'$, are positive integers and meet a condition in which $$y_1' + \ldots + y_{k'}' = n - (N - k') \lceil \frac{n}{N} \rceil,$$

and wherein k' is a positive integer less than the quantity N.

14. A data transmission apparatus, comprising:
 a receiver, configured to:
  receive a first signaling, wherein the first signaling comprises first information, the first information indicating a quantity N of precoding matrix indicators (TPMIs) to be transmitted in a second signaling, and N is a positive integer, and
  receive the second signaling based on the first signaling, wherein the second signaling comprises resource scheduling information of the data transmission apparatus and the N TPMIs, the resource scheduling information indicates a quantity n of scheduled physical resource blocks (PRBs) of M PRBs comprised in a communication bandwidth, the n PRBs are classified into N PRB groups, each of the N PRB groups comprises at least one PRB, the N TPMIs indicate N precoding matrices of the n PRBs, and each of the N TPMIs indicates a respective corresponding precoding matrix of a corresponding PRB group of the N PRB groups.

15. The apparatus according to claim 14, wherein the first information is an integer value of the quantity N.

16. The apparatus according to claim 14, wherein an $i^{th}$ TPMI of the N TPMIs indicates a corresponding precoding matrix of x, PRBs of the M PRBs, i∈{1, ..., N}, M, n, and $x_i$ are all positive integers, $x_1 + \ldots x_N \leq M$, quantities of PRBs comprised in N-k PRB groups of the N PRB groups are respectively $z_1$, ..., and $z_{N-k}$, $z_1 = x_{i_1}$, $z_2 = x_{i_2}$, ..., and $z_{N-k} = x_{i_{N-k}}$, quantities of PRBs comprised in k PRB groups other than the N-k PRB groups of the N PRB groups are respectively $y_1$, ..., and $y_k$, and $y_1$, ..., and $y_k$ are all positive integers and meet a condition in which $y_1 + \ldots + y_k = n - x_1 - \ldots - x_{N-k}$, and wherein k is a positive integer less than the quantity N.

17. The apparatus according to claim 14, wherein the first information comprises a quantity of bits in a TPMI field in the second signaling, and the quantity of bits in the TPMI field corresponds to the quantity N of TPMIs.

18. The apparatus according to claim 14, wherein the first information comprises a bandwidth with m PRBs, and the m PRBs are associated with the N TPMIs, and wherein m is a positive integer, and m is less than the quantity M.

19. The apparatus according to claim 14, wherein a quantity of PRBs comprised in each of N-k' PRB groups of the N PRB groups is $$\left\lceil \frac{n}{N} \right\rceil,$$

quantities of PRBs comprised in k' PRB groups other than the N-k' PRB groups of the N PRB groups are $y_1', \ldots,$ and $y_{k'}'$, and $y_1', \ldots,$ and $y_{k'}'$, are positive integers and meet a condition in which $$y_1' + \ldots + y_{k'}' = n - (N - k')\left\lceil \frac{n}{N} \right\rceil,$$

wherein k' is a positive integer less than the quantity N.

20. The apparatus according to claim 14, further comprising:
- a non-transitory memory comprising a program that is executable by a processor, the program comprising instructions configured to precode to-be-sent data based on the resource scheduling information and the N TPMIs.

* * * * *

UNITED STATES PATENT AND TRADEMARK OFFICE
CERTIFICATE OF CORRECTION

PATENT NO. : 10,944,462 B2
APPLICATION NO. : 16/671722
DATED : March 9, 2021
INVENTOR(S) : Li et al.

It is certified that error appears in the above-identified patent and that said Letters Patent is hereby corrected as shown below:

In the Claims

In Column 34, Line 47, Claim 3, delete "$i^{th}$" and insert --ith--.

In Column 34, Lines 48-49, Claim 3, delete "matrix of x" and insert --matrix of $x_i$--.

In Column 34, Line 49, Claim 3, delete "and x" and insert --and $x_i$--.

In Column 34, Lines 55-56, Claim 3, delete "respectively $y_1$, ..., and $y_k$, $y_1$, ..., and $y_k$ are all positive integers" and insert --respectively $y_1$, ..., and $y_k$, and $y_1$, ..., and $y_k$ are all positive integers--.

In Column 34, Line 57, Claim 3, delete "$y_i$" and insert --$y_1$--.

In Column 35, Line 47, Claim 10, delete "$i^{th}$" and insert --ith--.

In Column 35, Line 49, Claim 10, delete "matrix of x" and insert --matrix of $x_i$--.

In Column 35, Line 50, Claim 10, delete "$x_1 +...+x_N \leq +M$" and insert --$x_1 +...+x_N \leq M$--.

In Column 35, Lines 52-53, Claim 10, delete "are respectively $z_1$, ..., and $z_{N-k}$, $z_1 = x_{i_1}, z_2 = x_{i_2}, ..., \text{and } z_{N-k} = x_{i_{N-k}}$" and insert --are respectively $z_1$, ..., and $z_{N-k}$, where $z_1 = x_{i_1}, z_2 = x_{i_2}, ..., \text{and } z_{N-k} = x_{i_{N-k}}$--.

In Column 35, Line 55, Claim 10, delete "respectively and $y_1$" and insert --respectively $y_1$--.

In Column 36, Line 20, Claim 13, delete "and wherein k' is a positive integer" and insert --wherein k' is a positive integer--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,944,462 B2

In Column 36, Line 46, Claim 16, delete "$i^{th}$" and insert --ith--.

In Column 36, Line 48, Claim 16, delete "matrix of x" and insert --matrix of $x_i$--.

In Column 36, Lines 51-52, Claim 16, delete "respectively $z_1$, ..., and $z_{N-k}$, $z_1 = x_{i_1}, z_2 = x_{i_2}, ...,$ and $z_{N-k} = x_{i_{N-k}}$" and insert --respectively $z_1$, ..., and $z_{N-k}$, where $z_1 = x_{i_1}, z_2 = x_{i_2}, ...,$ and $z_{N-k} = x_{i_{N-k}}$--.